US011862119B2

(12) United States Patent
Ishihara

(10) Patent No.: US 11,862,119 B2
(45) Date of Patent: Jan. 2, 2024

(54) DISPLAY DEVICE

(71) Applicant: Japan Display Inc., Tokyo (JP)

(72) Inventor: Tomoyuki Ishihara, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/495,035

(22) Filed: Oct. 6, 2021

(65) Prior Publication Data

US 2022/0114977 A1 Apr. 14, 2022

(30) Foreign Application Priority Data

Oct. 12, 2020 (JP) ................................ 2020-171987

(51) Int. Cl.
*G09G 3/36* (2006.01)

(52) U.S. Cl.
CPC ... *G09G 3/3607* (2013.01); *G09G 2320/0666* (2013.01)

(58) Field of Classification Search
CPC .................... G09G 3/3607; G09G 2320/0666
See application file for complete search history.

(56) References Cited

U.S. PATENT DOCUMENTS

2010/0156926 A1 6/2010 Furukawa et al.
2015/0070404 A1* 3/2015 Chu Ke ............... G09G 3/3607 345/88
2019/0265552 A1* 8/2019 Shiomi ..................... G06T 5/00
2021/0012726 A1* 1/2021 Ozaki ...................... G09G 3/36

FOREIGN PATENT DOCUMENTS

JP 2010-145978 A 7/2010
JP 2015038544 A * 2/2015

* cited by examiner

*Primary Examiner* — Kenneth B Lee, Jr.
(74) *Attorney, Agent, or Firm* — K&L Gates LLP

(57) ABSTRACT

According to an aspect, a display device includes a display panel configured to display an image; and a light source configured to emit light to the display panel. The light source includes a first light source configured to emit light in a first primary color, a second light source configured to emit light in a second primary color, and a third light source configured to emit light in a third primary color. A frame period that is a display period of one frame image includes a predetermined number of subframe periods, the predetermined number is four or greater, and color reproduction of the one frame image is performed by a combination of colors that are output in the predetermined number of subframe periods. An output order of colors of the subframe periods is an order of colors in a clockwise direction or in a counterclockwise direction in a hue circle.

13 Claims, 18 Drawing Sheets

FIG.7

| LIGHTING COLOR CONFIGURATION | COMBINATION OF SUBFRAME PERIOD LIGHTING COLORS | | | |
|---|---|---|---|---|
| | FIRST COLOR | SECOND COLOR | THIRD COLOR | FOURTH COLOR |
| PATTERN 1 | R | Y | G | B |
| PATTERN 2 | R | G | C | B |
| PATTERN 3 | R | G | B | M |
| PATTERN 4 | R | W | G | B |

FIG.8

| FRAME | LIGHTING COLOR CONFIGURATION | SUBFRAME PERIOD LIGHTING COLORS | | | |
|---|---|---|---|---|---|
| | | SF1 | SF2 | SF3 | SF4 |
| Fn | PATTERN 1 | R | Y | G | B |
| F (n+1) | INTERMEDIATE PATTERN 1 | R | Y+G | G | B |
| F (n+2) | INTERMEDIATE PATTERN 2 | R | G | G | B |
| F (n+3) | INTERMEDIATE PATTERN 3 | R | G | G+C | B |
| F (n+4) | PATTERN 2 | R | G | C | B |

FIG.14

| FRAME | LIGHTING COLOR CONFIGURATION | SUBFRAME PERIOD LIGHTING COLORS | | | |
|---|---|---|---|---|---|
| | | SF1 | SF2 | SF3 | SF4 |
| Fn | PATTERN 3 | R | G | B | M |
| F (n+1) | INTERMEDIATE PATTERN 4 | R | G | B | M+R |
| F (n+2) | INTERMEDIATE PATTERN 5 | R | G | B | R |
| F (n+3) | INTERMEDIATE PATTERN 6 | R+W | G | B | R |
| F (n+4) | PATTERN 4 | W | G | B | R |

FIG.15

| FRAME | LIGHTING COLOR CONFIGURATION | SUBFRAME PERIOD LIGHTING COLORS | | | |
|---|---|---|---|---|---|
| | | SF1 | SF2 | SF3 | SF4 |
| Fn | PATTERN 1 | R | Y | G | B |
| F (n+1) | INTERMEDIATE PATTERN 7 | R | Y+W | G | B |
| F (n+2) | PATTERN 4 | R | W | G | B |

FIG.17

| LIGHTING COLOR CONFIGURATION | COMBINATION OF SUBFRAME PERIOD LIGHTING COLORS | | | | |
|---|---|---|---|---|---|
| | FIRST COLOR | SECOND COLOR | THIRD COLOR | FOURTH COLOR | FIFTH COLOR |
| PATTERN 11 | R | Y | G | C | B |
| PATTERN 12 | R | Y | G | B | M |
| PATTERN 13 | R | Y | W | G | B |
| PATTERN 14 | R | W | G | C | B |
| PATTERN 15 | R | G | C | B | M |
| PATTERN 16 | R | W | G | B | M |

FIG.18

| FRAME | LIGHTING COLOR CONFIGURATION | SUBFRAME PERIOD LIGHTING COLORS | | | | |
|---|---|---|---|---|---|---|
| | | SF1 | SF2 | SF3 | SF4 | SF5 |
| Fn | PATTERN 12 | R | Y | G | B | M |
| F (n+1) | INTERMEDIATE PATTERN 11 | R | Y+G | G | B | M |
| F (n+2) | INTERMEDIATE PATTERN 12 | R | G | G | B | M |
| F (n+3) | INTERMEDIATE PATTERN 13 | R | G | G+C | B | M |
| F (n+4) | PATTERN 14 | R | G | C | B | M |

FIG.19

| FRAME | LIGHTING COLOR CONFIGURATION | SUBFRAME PERIOD LIGHTING COLORS | | | | |
|---|---|---|---|---|---|---|
| | | SF1 | SF2 | SF3 | SF4 | SF5 |
| Fn | PATTERN 11 | R | Y | G | C | B |
| F (n+1) | INTERMEDIATE PATTERN 14 | R | Y+R | G | C | B |
| F (n+2) | INTERMEDIATE PATTERN 15 | R | R | G | C | B |
| F (n+3) | INTERMEDIATE PATTERN 16 | R+M | R | G | C | B |
| F (n+4) | PATTERN 15 | M | R | G | C | B |

FIG.20

| FRAME | LIGHTING COLOR CONFIGURATION | SUBFRAME PERIOD LIGHTING COLORS | | | | |
|---|---|---|---|---|---|---|
| | | SF1 | SF2 | SF3 | SF4 | SF5 |
| Fn | PATTERN 13 | R | Y | W | G | B |
| F (n+1) | INTERMEDIATE PATTERN 17 | R | Y+R | W+Y | G | B |
| F (n+2) | INTERMEDIATE PATTERN 18 | R | R | W+Y | G | B |
| F (n+3) | INTERMEDIATE PATTERN 19 | R+M | R | W+Y | G | B |
| F (n+4) | PATTERN 12 | M | R | Y | G | B |

FIG.21

| FRAME | LIGHTING COLOR CONFIGURATION | SUBFRAME PERIOD LIGHTING COLORS | | | | |
|---|---|---|---|---|---|---|
| | | SF1 | SF2 | SF3 | SF4 | SF5 |
| Fn | PATTERN 13 | R | Y | W | G | B |
| F (n+1) | INTERMEDIATE PATTERN 20 | R | Y+R | W+G | G | B |
| F (n+2) | INTERMEDIATE PATTERN 21 | R | R | G | G | B |
| F (n+3) | INTERMEDIATE PATTERN 22 | R+M | R | G | G+C | B |
| F (n+4) | PATTERN 15 | M | R | G | C | B |

FIG.22

| LIGHTING COLOR CONFIGURA TION | COMBINATION OF SUBFRAME PERIOD LIGHTING COLORS | | | | | |
|---|---|---|---|---|---|---|
| | FIRST COLOR | SECOND COLOR | THIRD COLOR | FOURTH COLOR | FIFTH COLOR | SIXTH COLOR |
| PATTERN 21 | R | Y | G | C | B | M |
| PATTERN 22 | R | Y | W | G | C | B |
| PATTERN 23 | R | Y | W | G | B | M |
| PATTERN 24 | R | W | G | C | B | M |

FIG.23

| FRAME | LIGHTING COLOR CONFIGURATION | SUBFRAME PERIOD LIGHTING COLORS | | | | | |
|---|---|---|---|---|---|---|---|
| | | SF1 | SF2 | SF3 | SF4 | SF5 | SF6 |
| Fn | PATTERN 21 | R | Y | G | C | B | M |
| F (n+1) | INTERMEDIATE PATTERN 31 | R | Y | G | C+G | B | M |
| F (n+2) | INTERMEDIATE PATTERN 32 | R | Y | G | G | B | M |
| F (n+3) | INTERMEDIATE PATTERN 33 | R | Y | G+W | G | B | M |
| F (n+4) | PATTERN 23 | R | Y | W | G | B | M |

FIG.24

| FRAME | LIGHTING COLOR CONFIGURATION | SUBFRAME PERIOD LIGHTING COLORS | | | | | |
|---|---|---|---|---|---|---|---|
| | | SF1 | SF2 | SF3 | SF4 | SF5 | SF6 |
| Fn | PATTERN 22 | R | Y | W | G | C | B |
| F (n+1) | INTERMEDIATE PATTERN 34 | R | Y | W | G | C+B | B |
| F (n+2) | INTERMEDIATE PATTERN 35 | R | Y | W | G | B | B |
| F (n+3) | INTERMEDIATE PATTERN 36 | R | Y | W | G | B | B+M |
| F (n+4) | PATTERN 23 | R | Y | W | G | B | M |

FIG.25

| FRAME | LIGHTING COLOR CONFIGURATION | SUBFRAME PERIOD LIGHTING COLORS | | | |
|---|---|---|---|---|---|
| | | SF1 | SF2 | SF3 | SF4 |
| Fn | PATTERN 1 | R | Y | G | B |
| F (n+1) | INTERMEDIATE PATTERN 41 | R | YG1 | G | B |
| F (n+2) | INTERMEDIATE PATTERN 42 | R | YG2 | G | B |
| F (n+3) | INTERMEDIATE PATTERN 43 | R | G | G | B |
| F (n+4) | INTERMEDIATE PATTERN 44 | R | G | GC1 | B |
| F (n+5) | INTERMEDIATE PATTERN 45 | R | G | GC2 | B |
| F (n+6) | PATTERN 2 | R | G | C | B |

FIG.26

| FRAME | LIGHTING COLOR CONFIGURATION | SUBFRAME PERIOD LIGHTING COLORS | | | |
|---|---|---|---|---|---|
| | | SF1 | SF2 | SF3 | SF4 |
| Fn | PATTERN 1 | R | Y | G | B |
| F (n+1) | INTERMEDIATE PATTERN 46 | R | G | G | B |
| F (n+2) | PATTERN 2 | R | G | C | B |

DISPLAY DEVICE

CROSS-REFERENCE TO RELATED APPLICATION

This application claims the benefit of priority from Japanese Patent Application No. 2020-171987 filed on Oct. 12, 2020, the entire contents of which are incorporated herein by reference.

BACKGROUND

1. Technical Field

What is disclosed herein relates to a display device.

2. Description of the Related Art

It is known there is a time-division field sequential color (FSC) display device that performs color reproduction of an image by generating display output periods corresponding to color components of red (R), green (G), and blue (B) in a display period of a frame image (for example, Japanese Patent Application Laid-open Publication No. 2010-145978 (JP-A-2010-145978)).

In the FSC display device, as disclosed in JP-A-2010-145978, if a display output period corresponding to a mixed color of the three primary colors such as yellow, cyan, and magenta, in addition to the display output period corresponding to the three primary colors of light of red (R), green (G), and blue (B), is included in the display period of a frame image, a state known as a flicker on an image may occur depending on the applied display control method. More specifically, color breakup may occur depending on the arrangement of the colors of the frames in the display output period, whereby a state known as a flicker on the image may occur.

For the foregoing reasons, there is a need for a display device that can further reduce the occurrence of a flicker on an image.

SUMMARY

According to an aspect, a display device includes a display panel configured to display an image using light from outside the display panel; and a light source configured to emit light to the display panel. The light source includes a first light source configured to emit light in a first primary color, a second light source configured to emit light in a second primary color, and a third light source configured to emit light in a third primary color. A frame period that is a display period of one frame image includes a predetermined number of subframe periods, the predetermined number is four or greater, and color reproduction of the one frame image is performed by a combination of colors that are output in the predetermined number of subframe periods. An output order of colors of the subframe periods is an order of colors in a clockwise direction or in a counterclockwise direction in a hue circle.

BRIEF DESCRIPTION OF THE DRAWINGS

FIG. 7 is a diagram illustrating combinations of colors of subframe periods that may be generated when m=4;

FIG. 8 is a diagram illustrating an example of subframe-period lighting colors of five consecutive frame periods;

FIG. 14 is a diagram illustrating another example of subframe-period lighting colors of each frame period, in a case of gradually changing the color of the subframe period, the color of which is changed before and after the change in pattern;

FIG. 15 is a diagram illustrating another example of subframe-period lighting colors of each frame period, in a case of gradually changing the color of the subframe period, the color of which is changed before and after the change in pattern;

FIG. 17 is a diagram illustrating combinations of colors of subframe periods that may be generated when m=5;

FIG. 18 is a diagram illustrating an example of subframe-period lighting colors in each frame period, in a case of gradually changing the color of the subframe period in a second embodiment;

FIG. 19 is a diagram illustrating another example of subframe-period lighting colors in each frame period, in a case of gradually changing the color of the subframe period in the second embodiment;

FIG. 20 is a diagram illustrating another example of subframe-period lighting colors in each frame period, in a case of gradually changing the color of the subframe period in the second embodiment;

FIG. 21 is a diagram illustrating another example of subframe-period lighting colors in each frame period, in a case of gradually changing the color of the subframe period in the second embodiment;

FIG. 22 is a diagram illustrating combinations of colors of subframe periods that may be generated when m=6;

FIG. 23 is a diagram illustrating an example of subframe-period lighting colors in each frame period, in a case of gradually changing the color of the subframe period in a third embodiment;

FIG. 24 is a diagram illustrating another example of subframe-period lighting colors in each frame period, in a case of gradually changing the color of the subframe period in the third embodiment;

FIG. 25 is a diagram illustrating another example of subframe-period lighting colors in each frame period F, in a case of gradually changing the color of the subframe period, the color of which is changed before and after the change in pattern; and FIG. 26 is a diagram illustrating another example of subframe-period lighting colors in each frame period F, in a case of gradually changing the color of the subframe period, the color of which is changed before and after the change in pattern.

DETAILED DESCRIPTION

Figure 1:
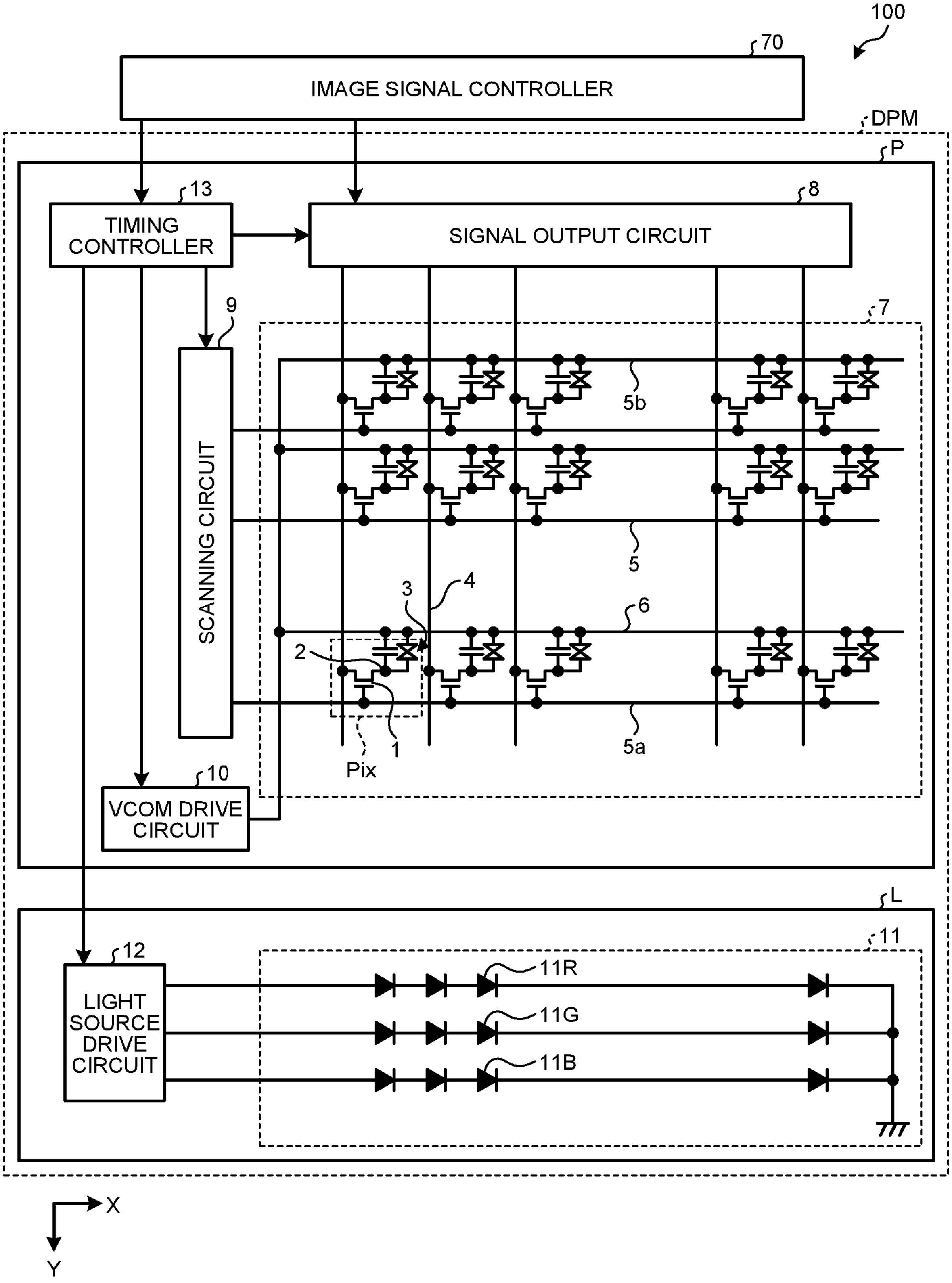
FIG. 1 is a schematic circuit diagram illustrating a main configuration of a display device.

Hereinafter, embodiments of the present disclosure will be described in detail with reference to the accompanying drawings. The disclosure is merely an example, and the present disclosure naturally encompasses appropriate modifications maintaining the gist of the invention that is easily conceivable by those skilled in the art. To further clarify the description, a width, a thickness, a shape, and the like of each component may be schematically illustrated in the drawings as compared with an actual aspect. However, this is merely an example, and the interpretation of the present disclosure is not limited thereto. The same element as that described in the drawing that has already been discussed is denoted by the same reference numeral throughout the present specification and the drawings, and the detailed description may be appropriately omitted.

In this disclosure, when an element is described as being "on" another element, the element can be directly on the other element, or there can be one or more elements between the element and the other element.

First Embodiment

FIG. 1 is a schematic circuit diagram illustrating a main configuration of a display device 100. The display device 100 includes a display panel module DPM and an image signal controller 70. The display panel module DPM includes a display panel P and a light source device L.

The display panel P includes a display area 7, a signal output circuit 8, a scanning circuit 9, a VCOM drive circuit 10, a timing controller 13, and a power supply circuit 14. Hereinafter, a surface of the display panel P corresponding to the display area 7 is referred to as a display surface, and the other surface is referred to as a rear surface. When it is described that an object is located on a lateral side of the display device 100, the object is located in a direction intersecting with (for example, orthogonal to) a facing direction in which the display surface and the rear surface face each other relative to the display device 100.

Figure 2:
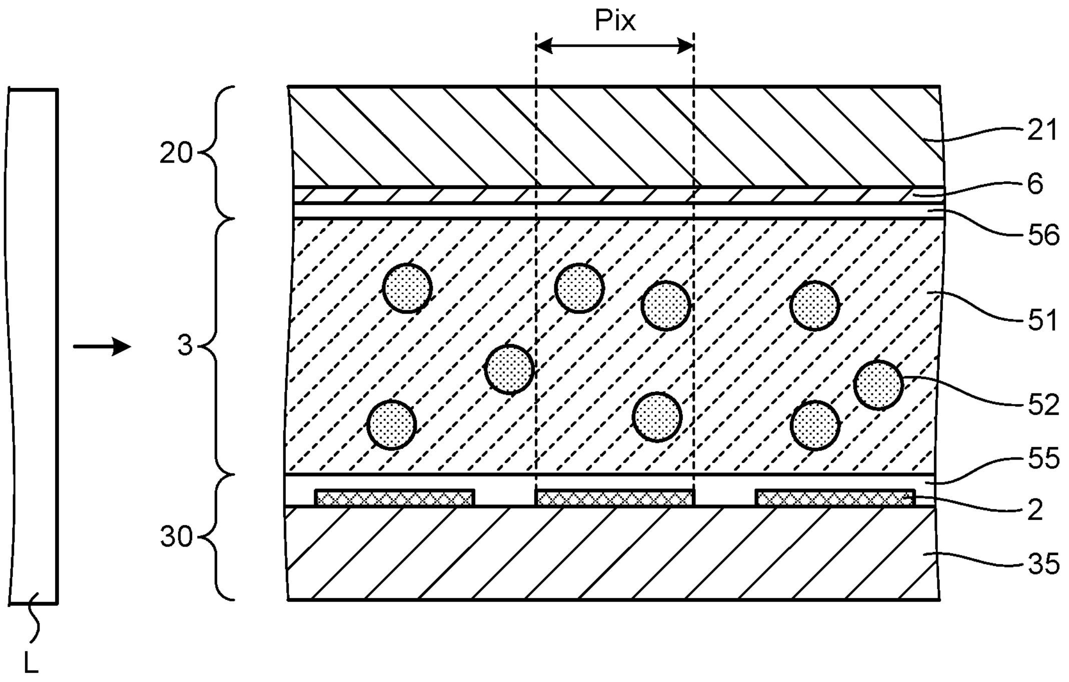
FIG. 2 is a schematic sectional view of a liquid crystal display panel.

In the display area 7, a plurality of pixels Pix are disposed in a matrix (row-column configuration). Each of the pixels Pix includes a switching element 1 and two electrodes. In FIG. 1 and FIG. 2, which will be described below, a pixel electrode 2 and a common electrode 6 are illustrated as the two electrodes.

FIG. 2 is a schematic sectional view of the display panel P. The display panel P includes two substrates facing each other, and liquid crystals 3 sealed between the two substrates. Hereinafter, one of the two substrates is referred to as a first substrate 30, and the other substrate is referred to as a second substrate 20.

The first substrate 30 includes a light transmitting glass substrate 35, the pixel electrode 2 layered on the second substrate 20 side of the glass substrate 35, and an insulation layer 55 layered on the second substrate 20 side so as to cover the pixel electrode 2. The pixel electrode 2 is individually provided for each pixel Pix. The second substrate 20 includes a light transmitting glass substrate 21, a common electrode 6 layered on the first substrate 30 side of the glass substrate 21, and an insulation layer 56 layered on the first substrate 30 side so as to cover the common electrode 6. The common electrode 6 is shared by the pixels Pix and is formed in a plate shape or a film shape.

The liquid crystals 3 in the first embodiment are polymer-dispersed liquid crystals. More specifically, the liquid crystals 3 include bulk 51 and fine particles 52. The orientation of the fine particles 52 changes in accordance with a potential difference between the pixel electrode 2 and the common electrode 6 in the bulk 51. By controlling the potential of the pixel electrode 2 individually for each pixel Pix, at least one of the degree of the light transmission and the degree of dispersion is controlled for each pixel Pix.

In the first embodiment described with reference to FIG. 2, the pixel electrodes 2 face the common electrode 6 with the liquid crystals 3 interposed therebetween. However, the configuration of the display panel P may be such that the pixel electrodes 2 and the common electrode 6 are provided on a single substrate, and that the orientations of the liquid crystals 3 are controlled by the electric field generated by the pixel electrode 2 and the common electrode 6.

Next, a mechanism for controlling the potentials of the pixel electrode 2 and the common electrode 6 will be described. As illustrated in FIG. 1, for example, the switching element 1 is a switching element using a semiconductor such as a thin film transistor (TFT). One of a source and a drain of the switching element 1 is coupled to one of the two electrodes (pixel electrode 2). The other of the source and the drain of the switching element 1 is coupled to a signal line 4. A gate of the switching element 1 is coupled to a scanning line 5. Under the control of the scanning circuit 9, the scanning line 5 supplies a potential for opening and closing the source and drain of the switching element 1. The scanning circuit 9 controls the potential.

In the example illustrated in FIG. 1, a plurality of the signal lines 4 are aligned in one alignment direction (row direction) of the pixels Pix. The signal lines 4 extend along the other alignment direction (column direction) of the pixels Pix. Each of the signal lines 4 is shared by a plurality of the switching elements 1 of the pixels Pix aligned in the column direction. A plurality of the scanning lines 5 are aligned along the column direction. The scanning lines 5 extend along the row direction. Each of the scanning lines 5 is shared by the switching elements 1 of the pixels Pix aligned in the row direction.

In the description of the first embodiment, the extending direction of the scanning lines 5 is referred to as an X direction, and a direction in which the scanning lines 5 are aligned is referred to as a Y direction. In FIG. 1, among the scanning lines 5, a scanning line 5*a* is disposed at one end in the Y direction, and a scanning line 5*b* is disposed at the other end.

The common electrode 6 is coupled to the VCOM drive circuit 10. The VCOM drive circuit 10 applies a potential that functions as a common potential to the common electrode 6. At a timing when the scanning circuit 9 applies a potential that functions as a drive signal to the scanning line 5, the signal output circuit 8 outputs a gradation signal, which will be described below, to the signal line 4. Thus, the liquid crystal (fine particles 52) serving as a storage capacitor and a capacitive load formed between the pixel electrode 2 and the common electrode 6 is charged. Consequently, the voltage between the pixel Pix and the common electrode 6 is set to a voltage corresponding to the gradation signal. When the drive signal is no longer supplied, the liquid crystal (fine particles 52) serving as the storage capacitor and the capacitive load holds the gradation signal. The scattering degree of the liquid crystal (fine particles 52) is controlled in accordance with the voltage of each pixel Pix and the voltage of the common electrode 6. For example, the liquid crystals 3 may be polymer-dispersed liquid crystals in which the scattering degree increases with an increase in the voltage between each pixel Pix and the common electrode 6. The liquid crystals 3 may also be polymer-dispersed liquid crystals in which the scattering degree increases with a decrease in the voltage between each pixel Pix and the common electrode 6.

As illustrated in FIG. 2, the light source device L is disposed on the lateral side of the display panel P. The light source device L includes a light source 11 and a light source drive circuit 12. The light source 11 includes a first light source 11R that emits light in red (R), a second light source 11G that emits light in green (G), and a third light source 11B that emits light in blue (B). Each of the first light source 11R, the second light source 11G, and the third light source 11B emits light under the control of the light source drive circuit 12. For example, the first light source 11R, the second light source 11G, and the third light source 11B in the first embodiment are light sources using a light emitting element such as a light emitting diode (LED). However, it is not limited thereto, and any light source is applicable as long as the light emission timing can be controlled. Under the control of the timing controller 13, the light source drive circuit 12 controls the light emission timing of the first light source 11R, the second light source 11G, and the third light source 11B. In the first embodiment, red (R) is the first primary color. In the first embodiment, green (G) is the second primary color. In the first embodiment, blue (B) is the third primary color.

When light is emitted from the light source 11, the display area 7 is illuminated by the light emitted from one side surface side in the Y direction. The pixels Pix transmit or scatter the light emitted from the one side surface side in the Y direction. The scattering degree depends on the state of the liquid crystals 3 controlled in accordance with the gradation signals.

The timing controller 13 is a circuit that controls operation timings of the signal output circuit 8, the scanning circuit 9, the VCOM drive circuit 10, and the light source drive circuit 12. In the first embodiment, the timing controller 13 operates based on a signal input via the image signal controller 70.

The image signal controller 70 outputs a signal, which is based on an input signal I (see FIG. 4) from the outside of the display device 100, to the signal output circuit 8 and the timing controller 13. When a pixel signal is a signal indicating the gradation values of RGB assigned to a certain pixel Pix, the input signal I that is input to the image signal controller 70 to output a frame image is a set of a plurality of the pixel signals corresponding to the pixels Pix provided in the display area 7. The image signal controller 70 may be provided on one of the substrates forming the display panel P, may be implemented in a flexible printed substrate provided with wiring extending from the display panel P or the like, or may be provided outside of the display panel P.

Figure 3:
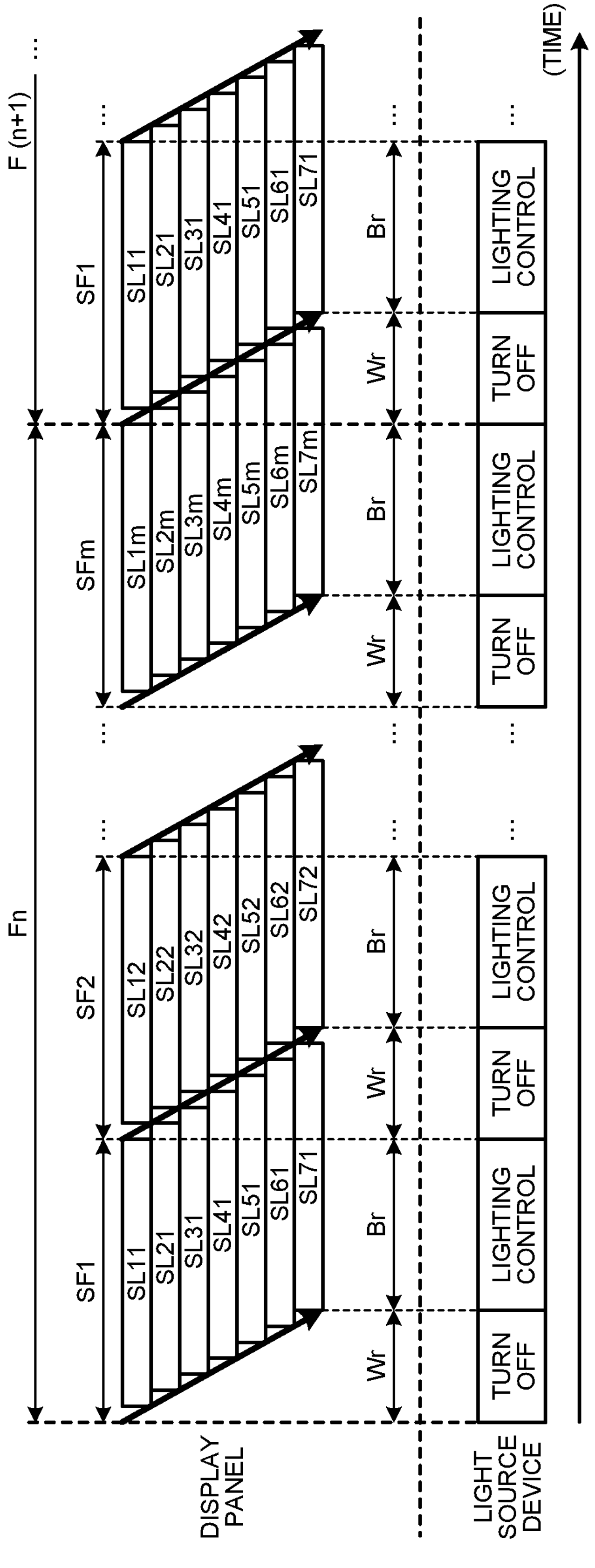
FIG. 3 is a time chart illustrating an example of FSC control.

FIG. 3 is a time chart illustrating an example of FSC control. As illustrated in FIG. 3, the first embodiment employs the time-division field sequential color (FSC) method in which frame periods F such as frame periods Fn and F(n+1) each include subframe periods SF1, SF2, . . . , SFm and light in different colors are emitted in lighting periods Br of the respective subframe periods SF1, SF2, . . . , SFm. Hereinafter, the frame periods Fn, F(n+1), . . . , are collectively referred to as a frame period F when they are not distinguished from one another. Each of the frame periods Fn, F(n+1), . . . is a period during which one frame image is displayed. The frame period F(n+1) is a frame period subsequent to the frame period Fn. n is a natural number. The subframe periods SF1, SF2, . . . , SFm are collectively referred to as a subframe period SF when they are not distinguished from one another. m is a natural number of 4 or more.

More specifically, in the first embodiment, a gradation signal corresponding to the lighting period Br is written in the subframe periods SF1, SF2, . . . , SFm included in the frame period F.

Assume that the color component reproduced by a signal supplied to one pixel Pix in the frame period Fn is (R, G, B)=(r0, g0, b0) when expressed by gradation values of RGB. The value r0 represents a gradation value of red (R) in an input signal including information on the gradation values of RGB and functions as a red (R) component of an image to be displayed in the display area 7. The value g0 represents a gradation value of green (G) in an input signal including information on the gradation values of RGB and functions as a green (G) component of an image to be displayed in the display area 7. The value b0 represents a gradation value of blue (B) in an input signal including information on the gradation values of RGB and functions as a blue (B) component of an image to be displayed in the display area 7.

In this example, the value r0 can be divided into m components such as r0=r1+r2+ . . . +rm. The value g0 can be divided into m components such as g0=g1+g2+gm. The value b0 can be divided into m components such as b0=b1+b2+bm. Thus, for the one pixel Pix, a pixel signal that can be expressed as (R, G, B)=(r1, g1, b1) is supplied in the subframe period SF1. For the one pixel Pix, a pixel signal that can be expressed as (R, G, B)=(r(m−k), g(m−k), b(m−k)) is supplied in the subframe period SF(m−k). k is an integer less than m. For example, when m=4, a case where k=3, a case where k=2, a case where k=1, and a case where k=0 are sequentially provided. The case where k=3 corresponds to the subframe period SF1 described above. For the one pixel Pix, a pixel signal that can be expressed as (R, G, B)=(rm, gm, bm) is supplied in the subframe period SFm. Consequently, a pixel signal corresponding to the color components the same as those of (R, G, B)=(r0, g0, b0) can be given to the one pixel Pix in the frame period Fn.

In this example, a case where m=4, that is, a case where there are four subframe periods, will be described. In the case where m=4, (R, G, B)=(r0, g0, b0) can be divided into (R, G, B)=(r1, g1, b1) to be supplied in the subframe period SF1, (R, G, B)=(r2, g2, b2) to be supplied in the subframe period SF2, (R, G, B)=(r3, g3, b3) to be supplied in the subframe period SF3, and (R, G, B)=(r4, g4, b4) to be supplied in the subframe period SF4.

Assume that (R, G, B)=(r0, g0, b0)=(35, 40, 30), for example. Light in white (W) can be reproduced by additive color mixing of red (R), green (G), and blue (B). Among the color components of (R, G, B)=(r0, g0, b0=(35, 40, 30) described above, the color components that can be extracted as white are (R, G, B)=(30, 30, 30). Thus, for example, by setting (R, G, B)=(r2, g2, b2)=(30, 30, 30), it is possible to supply a pixel signal corresponding to the color components that can be extracted as white in the subframe period SF2. By emitting light in white (W) during the lighting period Br in the subframe period SF2 to the pixel supplied with such a pixel signal, white (W) can be displayed and output. More specifically, by turning ON the first light source 11R, the second light source 11G, and the third light source 11B, the light source device L can emit light in white (W).

The color components obtained by subtracting the color components that can be extracted as white from the color components of (R, G, B)=(r0, g0, b0)=(35, 40, 30) described above, are (R, G, B)=(5, 10, 0). Thus, for example, by setting (R, G, B)=(r1, g1, b1)=(5, 0, 0), it is possible to supply a pixel signal corresponding to the color component of red (R) in the subframe period SF1. By emitting light in red (R) for the pixel supplied with such a pixel signal toward the display panel P in the lighting period Br in the subframe period SF1, red (R) can be displayed and output. More specifically, by turning ON the first light source 11R, the light source device L can emit light in red (R). By setting (R, G, B)=(r3, g3, b3)=(0, 10, 0), it is possible to supply a pixel signal corresponding to the color component of green (G) in the subframe period SF3. By emitting light in green (G) for the pixel supplied with such a pixel signal toward the display panel P in the lighting period Br in the subframe period SF3, green (G) can be displayed and output. More specifically, by turning ON the second light source 11G, the light source device L can emit light in green (G). In this example, the output corresponding to the color components of (R, G, B)=(r0, g0, b0)=(35, 40, 30) is performed in the subframe periods SF1, SF2, and SF3, thereby establishing (R, G, B)=(r4, g4, b4)=(0, 0, 0). As far as this pixel Pix is concerned, there is no need to emit light in blue (B) toward the display panel P in the lighting period Br in the subframe period SF4. On the other hand, this example is merely explaining a signal supplied to one pixel Pix, and color reproduction corresponding to blue (B) may need to be performed for the other pixel Pix. Thus, in this example, light in blue (B) is emitted in the lighting period Br in the subframe period SF4.

In this manner, each of signals supplied to the respective pixels Pix in the frame period is divided into m pieces and is individually supplied in each subframe period SF. The light corresponding to the supplied pixel signal is emitted to the display panel P from the light source device L. Thus, the display panel P can perform display output corresponding to the input image.

During a writing period Wr in each subframe period SF, the TFT provided in the pixel Pix is turned ON by a drive signal from the scanning circuit 9 to the scanning line 5, and signal control is performed to write a gradation signal to the pixel Pix by a gradation signal from the signal output circuit 8 to the signal line 4. Thus, the gradation signals corresponding to the pixels Pix included in a pixel row that are coupled to the common scanning line 5 and that are simultaneously turned ON in accordance with the drive signal for the scanning line 5, are written at the same timing. When an image written to the pixel row coupled to the common scanning line 5 in this manner is referred to as a line image, the frame image includes a plurality of the line images aligned along the alignment direction of the scanning lines 5. The line image is an image displayed and output by the pixels Pix aligned along the extending direction of the scanning lines 5 (alignment direction of the signal lines 4). Hereinafter, unless otherwise specified, when simply referred to as a "line", it refers to a pixel row that outputs a line image.

In the time chart and the like illustrated in FIG. 3, FIG. 9 (which will be described later), and other figures, the gradation signal control related to a line image to be output to a display area of seven lines is illustrated as an example. For example, in FIG. 3, a drive signal is output from the scanning circuit 9 to the scanning line 5 such that the scanning lines 5 are sequentially scanned from the scanning line 5 located on one end side in the Y direction (for example, the scanning line 5*a* illustrated in FIG. 1) toward the scanning line 5 located on the other side (for example, the scanning line 5*b* illustrated in FIG. 1), during the writing period Wr in each subframe period SF. Consequently, for the display area of seven lines illustrated in FIG. 3, line images SL11, SL21, SL31, SL41, SL51, SL61, and SL71 are sequentially written during the writing period Wr in the subframe period SF1. Line images SL12, SL22, SL32, SL42, SL52, SL62, and SL72 are also sequentially written during the writing period Wr in the subframe period SF2. Line images SL1*m*, SL2*m*, SL3*m*, SL4*m*, SL5*m*, SL6*m*, and SL7*m* are also sequentially written during the writing period Wr in the subframe period SFm. Although not clearly illustrated, line images SL1(*m*−k), SL2(*m*−k), SL3(*m*−k), SL4(*m*−k), SL5(*m*−k), SL6(*m*−k), and SL7(*m*−k) are sequentially written during the writing period Wr in the subframe period SF(m−k) prior to the subframe period SFm.

An example of a relation, which is obtained when m=4, between the above line images and (R, G, B)=(r0, g0, b0) according to a series of the above processing will now be described. The pixel signal of (R, G, B)=(r1, g1, b1) is included in one of the line images SL11, SL21, SL31, SL41, SL51, SL61, and SL71 written during the writing period Wr in the subframe period SF1. The pixel signal of (R, G, B)=(r2, g2, b2) is included in one of the line images SL12, SL22, SL32, SL42, SL52, SL62, and SL72 written during the writing period Wr in the subframe period SF2. The pixel signal of (R, G, B)=(r3, g3, b3) is included in one of the line images SL13, SL23, SL33, SL43, SL53, SL63, and SL73 written during the writing period Wr in the subframe period SF3. The pixel signal of (R, G, B)=(r4, g4, b4) is included in one of the line images SL14, SL24, SL34, SL44, SL54, SL64, and SL74 written during the writing period Wr in the subframe period SF4.

The configuration and control of the seven lines in FIG. 3, FIG. 9 (which will be described later), and other figures are merely examples for easy understanding, and are not intended to limit the number of lines in the display area 7 to seven lines. The number of lines in the display area 7 may be any number as long as it is plural, and may be six or less or eight or more.

Figure 4:
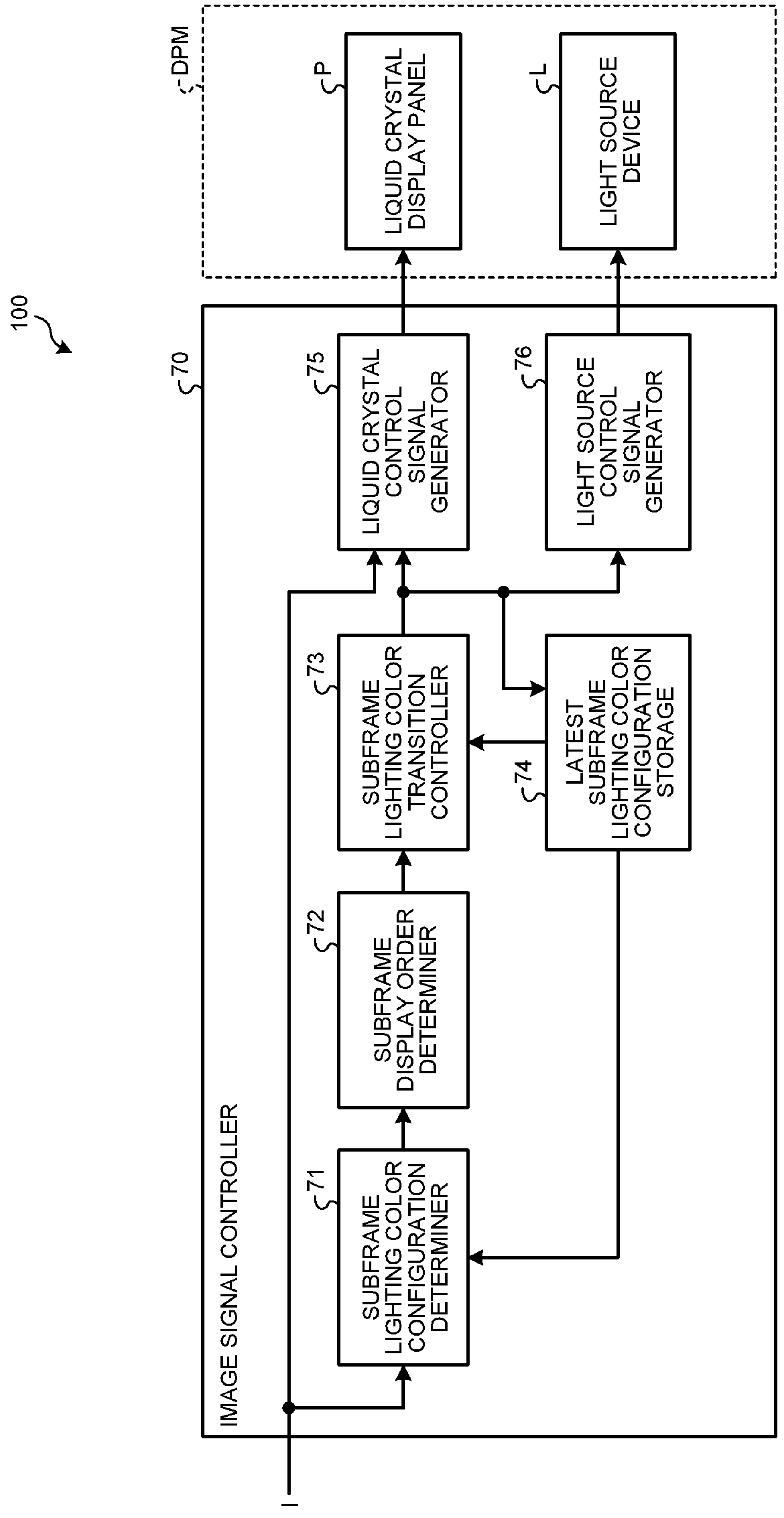
FIG. 4 is a block diagram illustrating an example of a main configuration of an image signal controller.

FIG. 4 is a block diagram illustrating an example of a main configuration of the image signal controller 70. The image signal controller 70 is an integrated circuit including a subframe lighting color configuration determiner 71, a subframe display order determiner 72, a subframe lighting color transition controller 73, a latest subframe lighting color configuration storage 74, a liquid crystal control signal generator 75, and a light source control signal generator 76.

The subframe lighting color configuration determiner 71 determines the color to be output in the subframe period SF other than the subframe period SF in which the primary color component is output. The subframe lighting color configuration determiner 71 in the first embodiment divides the color components indicated by the pixel signal supplied to each of the pixels corresponding to the input frame image, into a white color component, a mixed color component, and a primary color component. The subframe lighting color configuration determiner 71 then determines the color component having a larger proportion other than the primary color components. The mixed color component is a color component obtained by mixing two or more colors of red (R), green (G), and blue (B) that are primary colors in the embodiment.

The white color component is a color component that can be output as white (W). The mixed color component is a color component that can be output as a mixed color of the primary colors. The mixed color component is a color component obtained by mixing two or more colors of red (R), green (G), and blue (B) that are primary colors in the embodiment. More specifically, the mixed color component in the embodiment is a cyan (C) component, a magenta (M) component, or a yellow (Y) component. Cyan (C) is complementary color of red (R). Magenta (M) is complementary color of green (G). Yellow (Y) is complementary color of blue (B). The primary color component is a color component required for outputting primary color. The primary color component in the first embodiment is one of the color components of red (R), green (G), and blue (B) and is a color component that cannot be converted into white (W) nor a mixed color.

Figure 5:
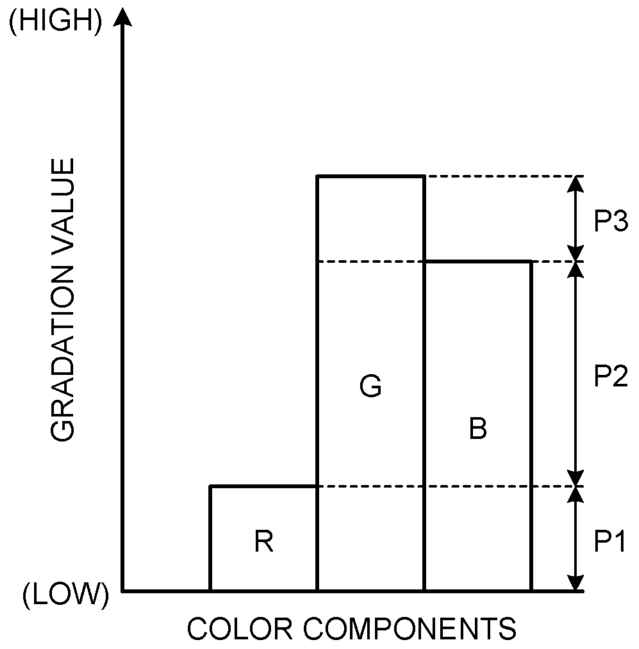
FIG. 5 is a graph illustrating an example of color components indicated by a pixel signal supplied to a certain pixel.

FIG. 5 is a graph illustrating an example of color components indicated by a pixel signal supplied to a certain pixel. The vertical axis of the graph in FIG. 5 indicates the high and low of the gradation values. With an increase in the gradation value, the pixel Pix is controlled such that the luminance of light corresponding to the color component is increased. The bar graphs of R, G, and B aligned along the horizontal axis in the graph illustrated in FIG. 5 correspond to the color components of red (R), green (G), and blue (B). That is, the height of each of the bar graphs indicates the high and low of the gradation value of red (R), green (G), or blue (B).

In the example illustrated in FIG. 5, the gradation value of red (R) corresponds to the height P1, the gradation value of green (G) corresponds to the height obtained by adding the height P1, the height P2, and the height P3, and the gradation value of blue (B) corresponds to the height obtained by adding the height P1 and the height P2. When the high and low relation of the height P1, the height P2, and the height P3 is expressed with inequality signs, P2>P1>P3 is established.

Figure 6:
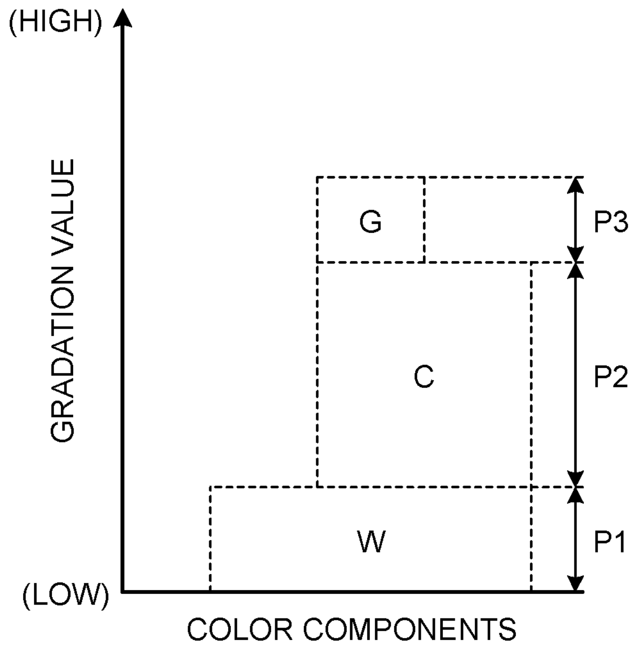
FIG. 6 is a graph illustrating an example in which the color components in FIG. 5 are divided into a white color component, a mixed color component, and a primary color component.

FIG. 6 is a graph illustrating an example in which the color components in FIG. 5 are divided into a white color component, a mixed color component, and a primary color component. The white color component is a color component of white (W). The white color component is produced by adding the red (R) component, the green (G) component, and the blue (B) component the gradation values of which are equal. In the case of the example illustrated in FIG. 5, the gradation value of red (R) corresponds to only the height P1 and is lower than the gradation values of green (G) and blue (B). Thus, a portion that can be converted to the white color component among the color components illustrated in FIG. 5 is a portion corresponding to the height P1 in each of the color components of red (R), green (G), and blue (B).

The remaining color components obtained by subtracting the white color component from the color components illustrated in FIG. 5, are the color component of green (G) and the color component of blue (B). In this example, in each of the color component of green (G) and the color component of blue (B), the portion corresponding to the height P1 is converted to the white color component. Thus, the color component of green (G) that is not converted to the white color component corresponds to the height of the gradation value obtained by adding the height P2 and the height P3. The color component of blue (B) that is not converted to white color component corresponds to the height of the gradation value indicated by the height P2.

In the color component of green (G) corresponding to the height of the gradation value obtained by adding the height P2 and the height P3, and in the color component of blue (B) corresponding to the height of the gradation value indicated by the height P2, the color component that can be converted to a mixed color component is the color component of cyan (C) corresponding to the height of the gradation value indicated by the height P2, as illustrated in FIG. 6. The color component obtained by subtracting the white color component and the mixed color component from the color component illustrated in FIG. 5, is the color component of green (G) corresponding to the height of the gradation value indicated by the height P3. Thus, in the examples illustrated in FIG. 5 and FIG. 6, the gradation value of white (W) serving as the white color component corresponds to the height P1, the gradation value of cyan (C) serving as the mixed color component corresponds to the height P2, and the gradation value of green (G) serving as the primary color component corresponds to the height P3.

The subframe lighting color configuration determiner 71 in the first embodiment determines the color component having a larger proportion other than the primary color components, among the color components reproduced by display output of a frame image corresponding to the input of the input signal I, based on the concept described with reference to FIG. 5 and FIG. 6. That is, the subframe lighting color configuration determiner 71 divides the gradation values of red (R), green (G), and blue (B) supplied to each of the pixels Pix indicated by the input signal I, into a white color component, a mixed color component, and a primary color component, and determines the color component having a larger proportion other than the primary color components.

The subframe lighting color configuration determiner 71 in the first embodiment determines the color component having the largest proportion other than the primary color components in each frame image. For example, in the frame image in which the pixel signal described with reference to FIG. 5 and FIG. 6 is supplied to all pixels Pix, P2>P1>P3 is established. Hence, the largest color component is cyan (C). Thus, in this case, the subframe lighting color configuration determiner 71 in the first embodiment determines cyan (C) as the color component having the largest proportion other than the primary color components in the frame image. The subframe lighting color configuration determiner 71 in the first embodiment handles the determined color as the color to be output in the subframe period SF other than the subframe period SF in which the primary color component is output.

The subframe lighting color configuration determiner 71 described above determines the color corresponding to the color component having the largest proportion other than the primary color components in the frame image, as the color to be output in the subframe period SF other than the subframe period SF in which the primary color component is output. However, this is an example obtained by the subframe lighting color configuration determiner 71 in the embodiment, and the function of the subframe lighting color configuration determiner 71 is not limited thereto. The subframe lighting color configuration determiner 71 may determine the color to be output in the subframe period SF using another method.

More specifically, the subframe lighting color configuration determiner 71 may set thresholds for the gradation values of the mixed color components and the gradation value of the white color component and determine the "color component having the largest proportion other than the primary color components in each frame image", in accordance with the result of the comparison between the gradation values and the threshold. In this case, the color that is output in another subframe period corresponds to the color component determined from among the mixed color components and the white color component included in the frame image to be displayed in the frame period including the other subframe period, based on the results of the comparison with a predetermined threshold. More specifically, a threshold is individually set for each of cyan (C), magenta (M), yellow (Y), and white (W). In this example, the threshold of yellow (Y) is smaller than the threshold of cyan (C) and the threshold of magenta (M). The threshold of white (W) is smaller than the threshold of cyan (C) and the threshold of magenta (M). The subframe lighting color configuration determiner 71 compares the gradation values of the mixed color components (cyan (C), magenta (M), and yellow (Y)) and the white color component with the thresholds individually set for the respective color components. The subframe lighting color configuration determiner 71 counts the number of pixels including the component indicating the gradation value equal to or higher than the threshold (or gradation value higher than the threshold) for each of the mixed color components and the white color component in the frame image. The subframe lighting color configuration determiner 71 then determines the component with the largest count number in the frame image, as the "color component having the largest proportion other than the primary color components in each frame image".

The subframe display order determiner 72 sets the color component other than the primary color components, which is determined by the subframe lighting color configuration determiner 71, as one of the colors to be output in the subframe periods SF. In the first embodiment, the subframe display order determiner 72 sets the colors to be output in three subframe periods SF among m subframe periods SF in one frame period F to the first primary color, the second primary color, and the third primary color. More specifically, the subframe display order determiner 72 sets the colors to be output in the three subframe periods SF in the m subframe periods SF in one frame period F to red (R), green (G), and blue (B).

Hereinafter, a case where m=4 will be described as an example. That is, the subframe display order determiner 72 in this example sets the colors to be output in the three subframe periods SF among m subframe periods SF (m=4) to red (R), green (G), and blue (B), and sets the color to be output in the remaining one subframe period SF as the color component other than the primary component determined by the subframe lighting color configuration determiner 71.

FIG. 7 is a diagram illustrating combinations of colors of the subframe periods SF that may be generated when m=4. In the display panel module DPM in the first embodiment described with reference to FIG. 1 and FIG. 2, the color of an image that is output in the subframe period SF depends on the color of light from the light source device L. Thus, in FIG. 7 and other figures, the color of the subframe period SF, that is, the color of light that is output from the light source device L in the subframe period SF is referred to as a subframe-period lighting color.

In the first embodiment, when the first primary color is red (R), the second primary color is green (G), and the third primary color is blue (B), the color components other than the primary color components are cyan (C), magenta (M), yellow (Y) and white (W). Thus, the combination of colors determined by the subframe display order determiner 72 is a pattern 1, a pattern 2, a pattern 3, or a pattern 4 as illustrated in FIG. 7. The pattern 1 is a pattern in which the first color is red (R), the second color is yellow (Y), the third color is green (G), and the fourth color is blue (B). The pattern 2 is a pattern in which the first color is red (R), the second color is green (G), the third color is cyan (C), and the fourth color is blue (B). The pattern 3 is a pattern in which the first color is red (R), the second color is green (G), the third color is blue (B), and the fourth color is magenta (M). The pattern 4 is a pattern in which the first color is red (R), the second color is white (W), the third color is green (G), and the fourth color is blue (B).

The subframe lighting color transition controller 73 controls the color transition orders of the subframe periods SF of each frame period F, based on the combinations of colors of the subframe periods SF determined by the subframe display order determiner 72.

First, a case where there is no constraint in determining the color transition order of the subframe period SF will be described. For example, a first frame image that is displayed first in the display area 7 after the start of the operation of the display device 100, is not subject to constraints based on the relation with frame images displayed before the display of the first frame image. Thus, when a frame image is displayed first in the display area 7 after the start of the operation of the display device 100, there is no constraint. In addition, when a display output does not fall under the constraints related to the contents stored in the latest subframe lighting color configuration storage 74, which will be describe later, there is no constraint on the display output.

When there is no constraint, the subframe lighting color transition controller 73 uses the combination of colors determined by the subframe display order determiner 72, as the combination of colors of the subframe periods SF included in the frame period F, as it is. More specifically, when there is no constraint, the subframe lighting color transition controller 73 sets, for example, the first color in the pattern employed by the subframe display order determiner 72 from among the pattern 1 to the pattern 4 illustrated in FIG. 7 as the color of the subframe period SF1, the second color in the pattern as the color of the subframe period SF2, the third color in the pattern as the color of the subframe period SF3, and the fourth color in the pattern as the color of the subframe period SF4. For example, when the subframe display order determiner 72 determines, based on the example described with reference to FIG. 5 and FIG. 6, to use the pattern 2 illustrated in FIG. 7 as the combination of colors of the subframe periods SF, the subframe lighting color transition controller 73 sets the color of the subframe period SF1 to red (R), sets the color of the subframe period SF2 to green (G), sets the color of the subframe period SF3 to cyan (C), and sets the color of the subframe period SF4 to blue (B).

Figure 16:
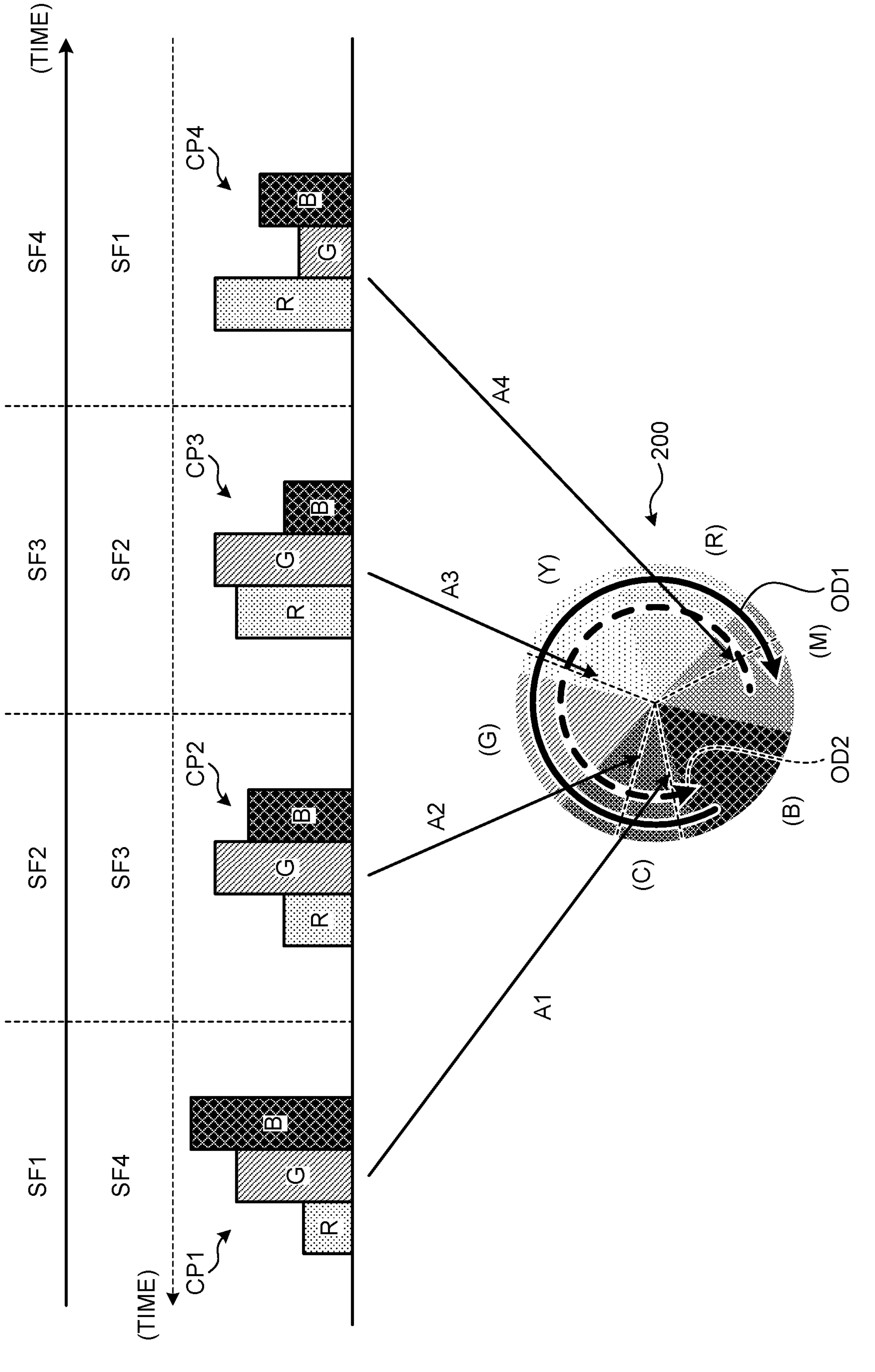
FIG. 16 is a diagram illustrating a relation between the color components in the subframe periods and the order of colors in the hue circle in a modification.

In this example, the output order of colors of the subframe periods SF employed by the subframe lighting color transition controller 73 is the order of colors in a clockwise direction OD1 or in a counterclockwise direction OD2 in a hue circle 200 (see FIG. 16). In the hue circle 200, when red (R) is the starting point, colors are arranged in the order of red (R), yellow (Y), green (G), cyan (C), blue (B), and magenta (M) in the counterclockwise direction OD2. When the color of the subframe period SF1 is red (R), the color of the subframe period SF2 is green (G), the color of the subframe period SF3 is cyan (C), and the color of the subframe period SF4 is blue (B) as described above, the output order of colors of the subframe periods SF is the order of colors in the counterclockwise direction OD2 in the hue circle 200 (FIG. 16). In this manner, the subframe lighting color transition controller 73 determines the output order of colors of the subframe periods SF in the frame period F such that the order of colors output of the subframe periods SF is in the clockwise direction OD1 or in the counterclockwise direction OD2 in the hue circle 200 (see FIG. 16).

In the example, the color of the subframe period SF determined by the subframe lighting color configuration determiner 71 is cyan (C). However, even when the color of the subframe period SF determined by the subframe lighting color configuration determiner 71 is another color, the subframe lighting color transition controller 73 determines the output order of colors of the subframe periods SF using the same concept. When there is no constraint in determining the color transition order of the subframe period SF, and when the subframe display order determiner 72 determines to employ the pattern 1, the subframe lighting color transition controller 73 sets the color of the subframe period SF1 to red (R), sets the color of the subframe period SF2 to yellow (Y), sets the color of the subframe period SF3 to green (G), and sets the color of the subframe period SF4 to blue (B). When the subframe display order determiner 72 determines to employ the pattern 3, the subframe lighting color transition controller 73 sets the color of the subframe period SF1 to red (R), sets the color of the subframe period SF2 to green (G), sets the color of the subframe period SF3 to blue (B), and sets the color of the subframe period SF4 to magenta (M). When the subframe display order determiner 72 determines to employ the pattern 4, the subframe lighting color transition controller 73 sets the color of the subframe period SF1 to red (R), sets the color of the subframe period SF2 to white (W), sets the color of the subframe period SF3 to green (G), and sets the color of the subframe period SF4 to blue (B).

FIG. 8 is a diagram illustrating an example of subframe-period lighting colors of five consecutive frame periods F. In the description with reference to FIG. 8, for example, the input signal I corresponding to the pattern 2 is input for the (n+1)-th frame period F(n+1), after the pattern 1 has been employed until the start of the n-th frame period Fn.

In this case, in accordance with the input of the input signal I corresponding to the n-th frame period Fn, the subframe lighting color configuration determiner 71 determines yellow (Y) as the color component having a larger proportion other than the primary color components. The subframe display order determiner 72 sets yellow (Y), which is determined by the subframe lighting color configuration determiner 71, as one of the colors to be output in the subframe periods SF. In accordance with the input of the input signal I corresponding to the (n+1)-th frame period F(n+1), the subframe lighting color configuration determiner 71 determines cyan (C) as the color component having a larger proportion other than the primary color components. The subframe display order determiner 72 sets cyan (C), which is determined by the subframe lighting color configuration determiner 71, as one of the colors to be output in the subframe periods SF. Consequently, the pattern 2 is employed for the (n+1)-th frame period F(n+1), after the pattern 1 has been employed until the start of the n-th frame period Fn.

In this example, assume that the pattern 1 is employed until the start of the n-th frame period Fn, and the display output of the colors of the subframe periods SF corresponding to the pattern 1 is not subject to the above constraints. If the colors of the subframe periods SF corresponding to the pattern 2 are output in the (n+1)-th frame period F(n+1) immediately afterwards, the subframe period SF in which green (G) is output is changed from the subframe period SF3 in the n-th frame period Fn to the subframe period SF2 in the (n+1)-th frame period F(n+1). Such a transition of colors in the subframe periods SF may be recognized as a flicker on the image for a user who is viewing the output for the frame periods F.

Hence, when the pattern employed by the subframe display order determiner 72 is changed between the n-th frame period Fn and the (n+1)-th frame period F(n+1), the subframe lighting color transition controller 73 in the first embodiment gradually changes the color of the subframe period SF, the color of which is changed before and after the change in pattern.

For example, when the subframe display order determiner 72 employs the pattern 1 for the n-th frame period Fn and employs the pattern 2 for the (n+1)-th frame period F(n+1), there is no change in the output order of red (R), which is the color of the subframe period SF1 in the frame periods F, and in the output order of blue (B), which is the color of the subframe period SF4 therein, before and after the change in pattern to be employed. Thus, in this case, the subframe period SF1 and the subframe period SF4 do not correspond to the subframe period SF the color of which is changed before and after the change in pattern. On the other hand, the color of the subframe period SF2 is yellow (Y) in the pattern 1, but is green (G) in the pattern 2. The color of the subframe period SF3 is green in the pattern 1, but is cyan (C) in the pattern 2. Thus, in this case, the subframe period SF2 and the subframe period SF3 correspond to the subframe period SF the color of which is changed before and after the change in pattern.

FIG. 8 is a diagram illustrating an example of subframe-period lighting colors in the frame periods F in the case of gradually changing the color of the subframe period SF, the color of which is changed before and after the change in pattern. As the example described above, when the subframe display order determiner 72 employs the pattern 1 for the n-th frame period Fn and employs the pattern 2 for the (n+1)-th frame period F(n+1), the subframe lighting color transition controller 73 generates the frame periods F assigned intermediate patterns for gradually changing the color of the subframe period SF, the color of which is changed before and after the change in pattern, before the frame period F during which the colors of the subframe periods SF corresponding to the pattern 2 are output, that is, between the frame period F corresponding to the pattern 1 and the frame period F corresponding to the pattern 2.

More specifically, as illustrated in FIG. 8, for the n-th frame period Fn, the subframe lighting color transition controller 73 follows the pattern 1, and sets the color of the subframe period SF1 to red (R), sets the color of the subframe period SF2 to yellow (Y), sets the color of the subframe period SF3 to green (G), and sets the color of the subframe period SF4 to blue (B).

Next, for the (n+1)-th frame period F(n+1), the subframe lighting color transition controller 73 employs an intermediate pattern 1 in which the color of the subframe period SF1 is set to red (R), the color of the subframe period SF2 is set to “color obtained by adding green to yellow (Y+G)”, the color of the subframe period SF3 is set to green (G), and the color of the sub-frame period SF4 is set to blue (B).

In this example, “color obtained by adding β to α” is, for example, the color in which the ratio between the color component of α and the color component of β is 1:1. However, the color is not limited thereto. The “color obtained by adding β to α” may be any mixed color of α and β, and the ratio and the like thereof may be changed as appropriate. α and β are different colors.

Next, for the (n+2)-th frame period F(n+2), the subframe lighting color transition controller 73 employs an intermediate pattern 2 in which the color of the subframe period SF1 is set to red (R), the color of the subframe period SF2 is set to green (G), the color of the subframe periods SF3 is set to green (G), and the color of the subframe period SF4 is set to blue (B).

Next, for the (n+3)-th frame period F(n+3), the subframe lighting color transition controller 73 employs an intermediate pattern 3 in which the color of the subframe period SF1 is set to red (R), the color of the subframe period SF2 is set to green (G), the color of the subframe period SF3 is set to “color obtained by adding cyan to green (G+C)”, and the color of the subframe period SF4 is set to blue (B).

Then, for the (n+4)-th frame period F(n+4), the subframe lighting color transition controller 73 sets the color of the subframe period SF1 to red (R), sets the color of the subframe period SF2 to green (G), sets the color of the subframe period SF3 to cyan (C), and sets the color of the subframe period SF4 to blue (B), thereby causing the pattern 2 to be in an employed state.

That is, in this example, when the subframe display order determiner 72 employs the pattern 2 for the (n+1)-th frame period F(n+1), the frame period in which the color of the subframe period SF corresponding to the pattern 2 is actually reflected on the output of the display panel P is the (n+4)-th frame period F(n+4).

The pattern is changed from the pattern 1 of the frame period Fn through the intermediate pattern 1 of the frame period F(n+1) to the intermediate pattern 2 of the frame period F(n+2). Thus, the color of the subframe period SF2 changes smoothly from yellow (Y) to green (G) via the “color obtained by adding green to yellow (Y+G)” over the three frame periods F. The pattern changes from the intermediate pattern 2 of the frame period F(n+2) through the intermediate pattern 3 of the frame period F(n+3) to the pattern 2 of the frame period F(n+4). Thus, the color of the subframe period SF3 changes smoothly from green (G) to cyan (C) via the “color obtained by adding cyan to green (G+C)” over the three frame periods F. In this manner, the color of the subframe period SF is changed smoothly between the frame periods F, whereby the occurrence of a state known as a flicker on the image can be reduced.

In this manner, in the first embodiment, when the mixed color component, which is contained most in the color of each of the frame images to be successively displayed on the display panel P, is transitioned from the first mixed color component to the second mixed color component, and when the frame period F prior to the transition includes the subframe SF in which the first mixed color component is output, the frame period F including the subframe period SF in which another color component between the first mixed color component and the second mixed color component in the hue circle is output, is generated before the frame period F subsequent to the transition and including the subframe period SF in which the second mixed color component is output. In the description with reference to FIG. 8 to FIG. 13, the first mixed color component is yellow (Y), and the second mixed color component is cyan (C). That is, in this example, the frame period prior to the transition is the frame period Fn, and the frame period subsequent to the transition is the frame period F(n+4). The frame period F including the subframe period SF in which another color component is output is the frame period F(n+1), the frame period F(n+2), and the frame period F(n+3).

The latest subframe lighting color configuration storage 74 stores data indicating the order of colors of the subframe periods SF in the frame period F employed in the past. For example, the latest subframe lighting color configuration storage 74 includes a storage circuit for storing the data such as a static random access memory (SRAM). For example, when the subframe display order determiner 72 determines to employ the pattern 2 for the frame period F(n+1) in the example described above, the process related to the output in the frame period Fn for which the pattern 1 is employed has already been performed. Thus, in this example, the latest subframe lighting color configuration storage 74 stores the data corresponding to the pattern 1.

A case where the constraint described above is imposed, is a case where the colors of the subframe periods SF indicated by the data stored in the latest subframe lighting color configuration storage 74 are different from the colors of the subframe periods SF indicated in the pattern newly employed by the subframe display order determiner 72. In this case, as in the example described above, the color of the subframe period SF will differ in the successive frame periods F. Thus, in this case, the subframe lighting color transition controller 73 determines that the constraints are imposed, and generates the frame periods F each including the colors of the subframe periods SF to each of which the intermediate pattern is applied, before the frame period F including the colors of the subframe periods SF directly corresponding to the pattern employed by the subframe display order determiner 72, thereby smoothly changing the color of the subframe periods SF.

Under the control of the subframe lighting color transition controller 73, the liquid crystal control signal generator 75 generates a pixel signal for each pixel Pix and outputs the generated pixel signal to the display panel P. The pixel signal is output to the signal output circuit 8 (see FIG. 1), and transmitted to each pixel Pix under the control of the signal output circuit 8.

Under the control of the subframe lighting color transition controller 73, the light source control signal generator 76 generates a control signal for controlling the operation of the light source device L such that the color of light from the light source device L in each subframe period SF becomes the subframe-period lighting color. The light source control signal generator 76 outputs the control signal to the light source device L. The first light source 11R, the second light source 11G, and the third light source 11B in the light source device L are turned ON in accordance with the control signal.

An example of how the display panel module DPM is controlled by the liquid crystal control signal generator 75 and the light source control signal generator 76 under the control of the subframe lighting color transition controller 73 will be described with reference to FIG. 9 to FIG. 13.

Figure 9:
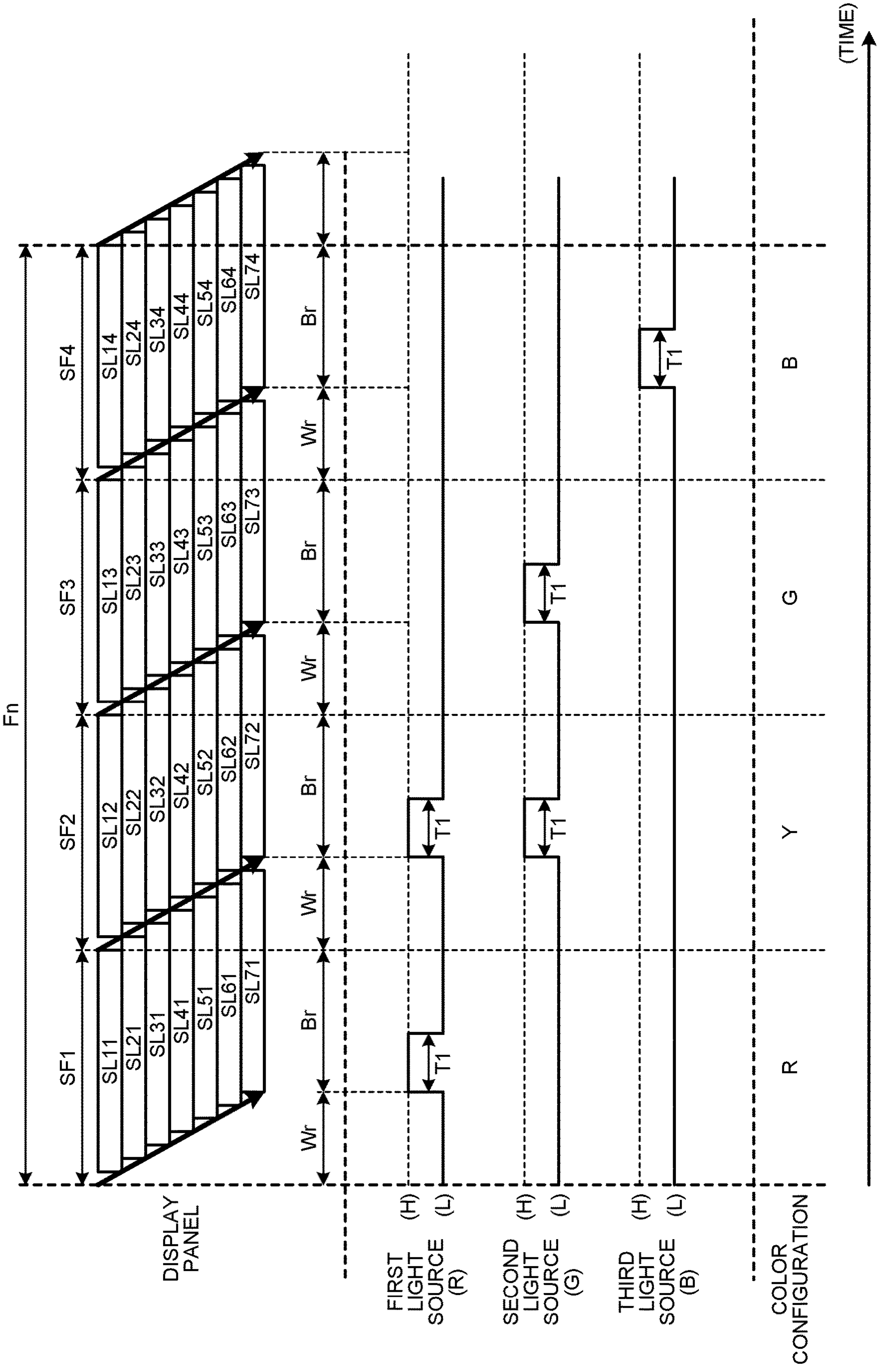
FIG. 9 is a diagram illustrating an example of lighting control of a first light source, a second light source, and a third light source during a frame period Fn.
Figure 10:
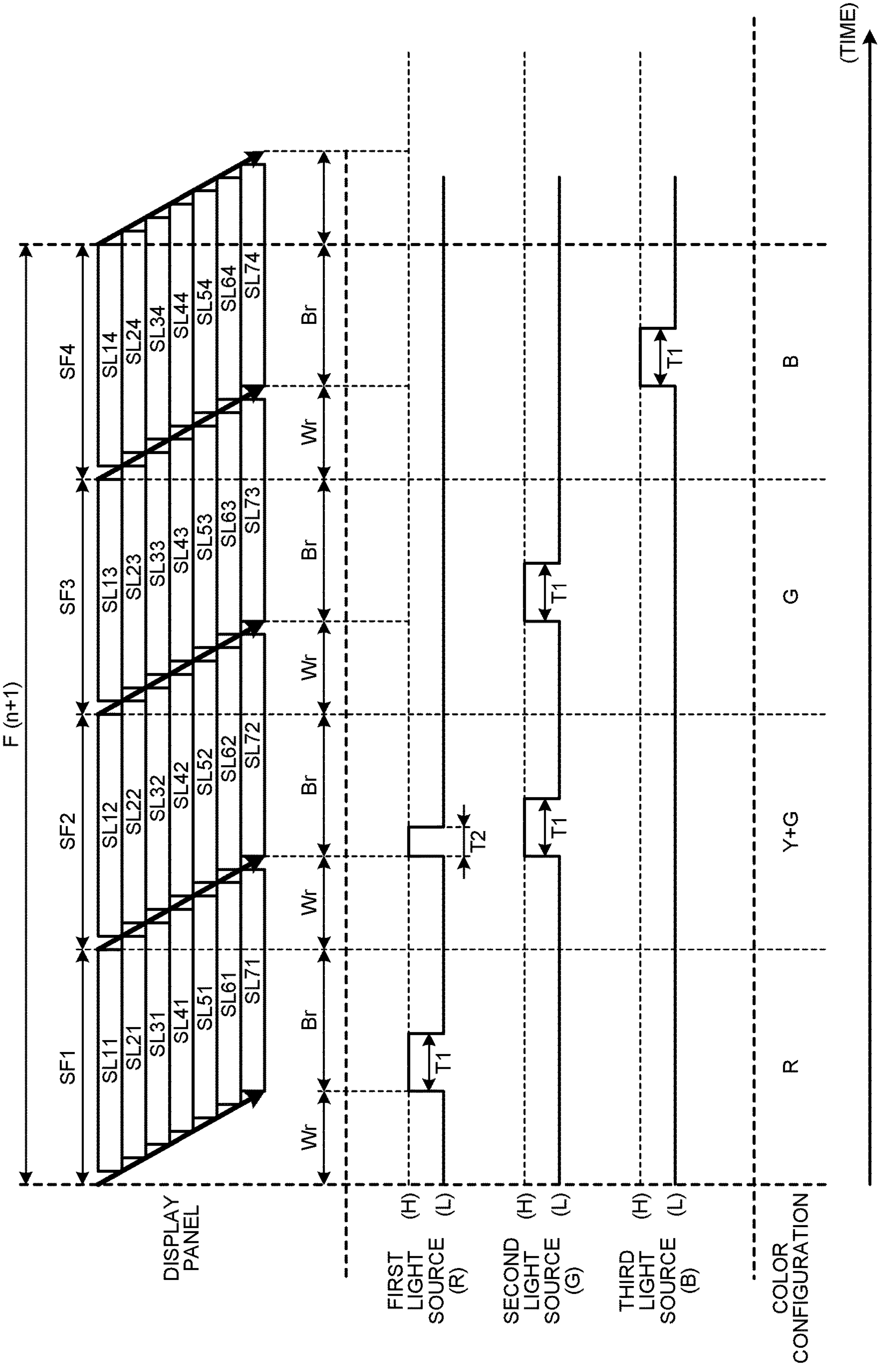
FIG. 10 is a diagram illustrating an example of lighting control of the first light source, the second light source, and the third light source during a frame period F(n+1)
Figure 11:
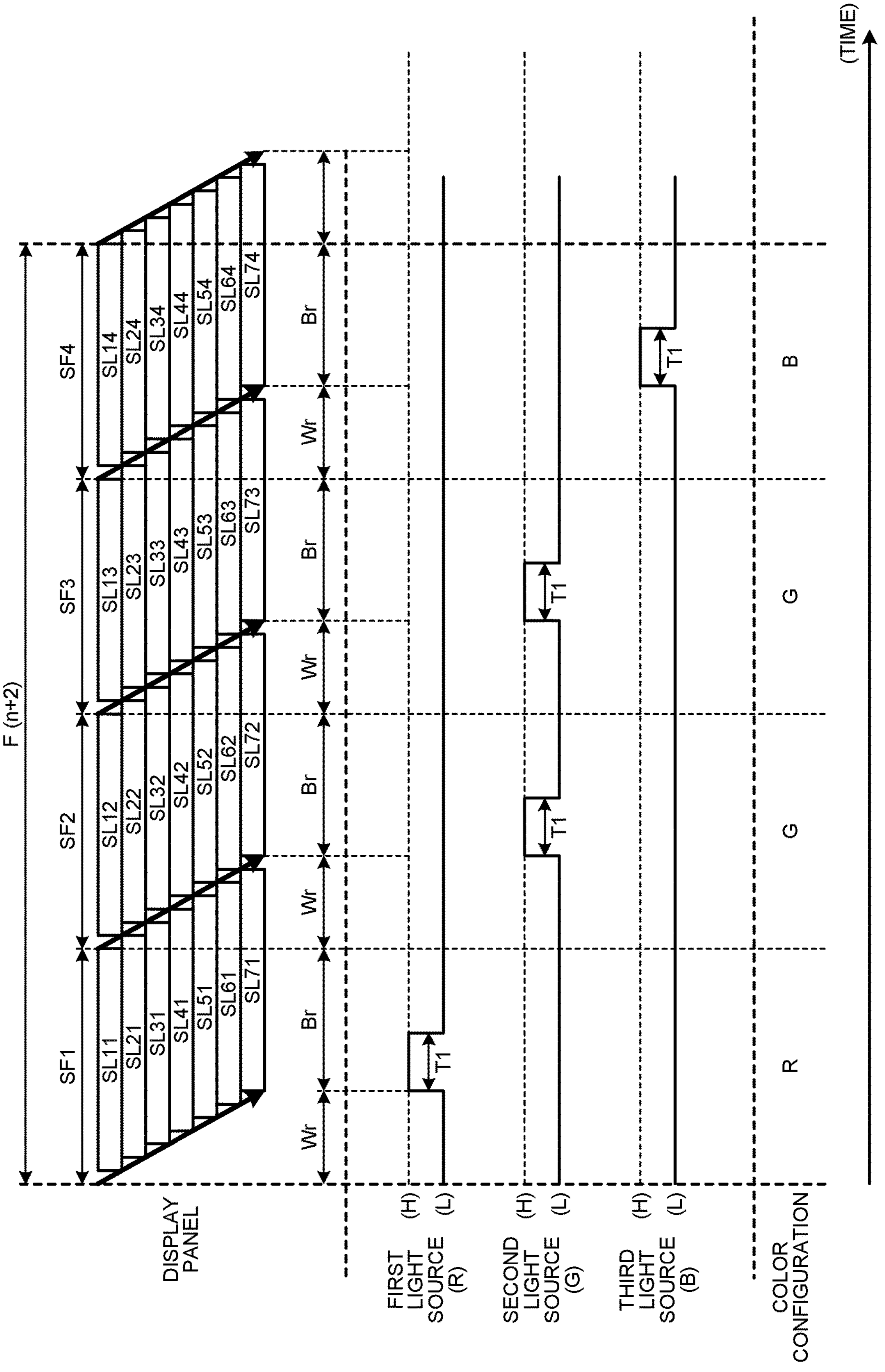
FIG. 11 is a diagram illustrating an example of lighting control of the first light source, the second light source, and the third light source during a frame period F(n+2)
Figure 12:
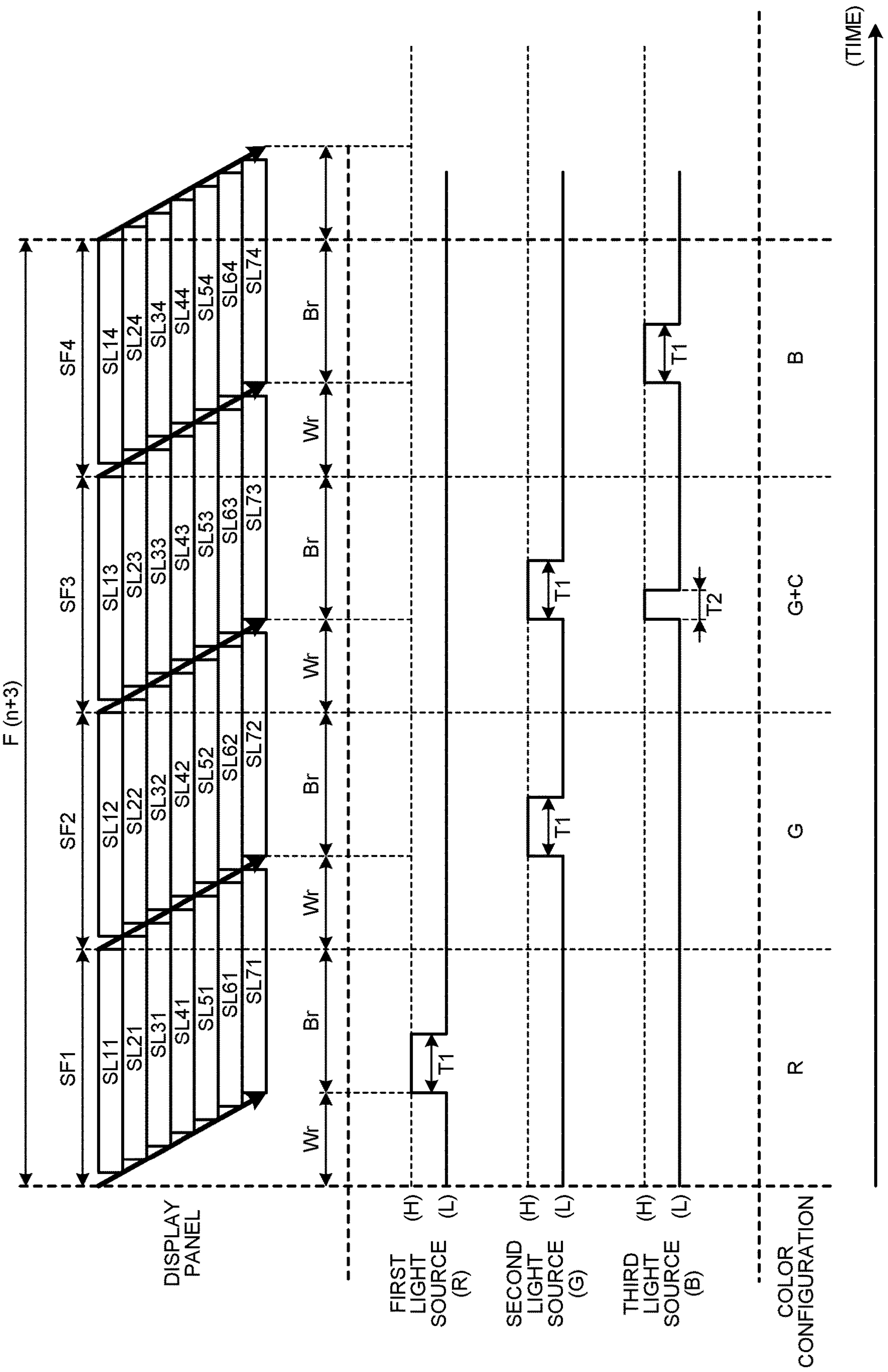
FIG. 12 is a diagram illustrating an example of lighting control of the first light source, the second light source, and the third light source during a frame period F(n+3)
Figure 13:
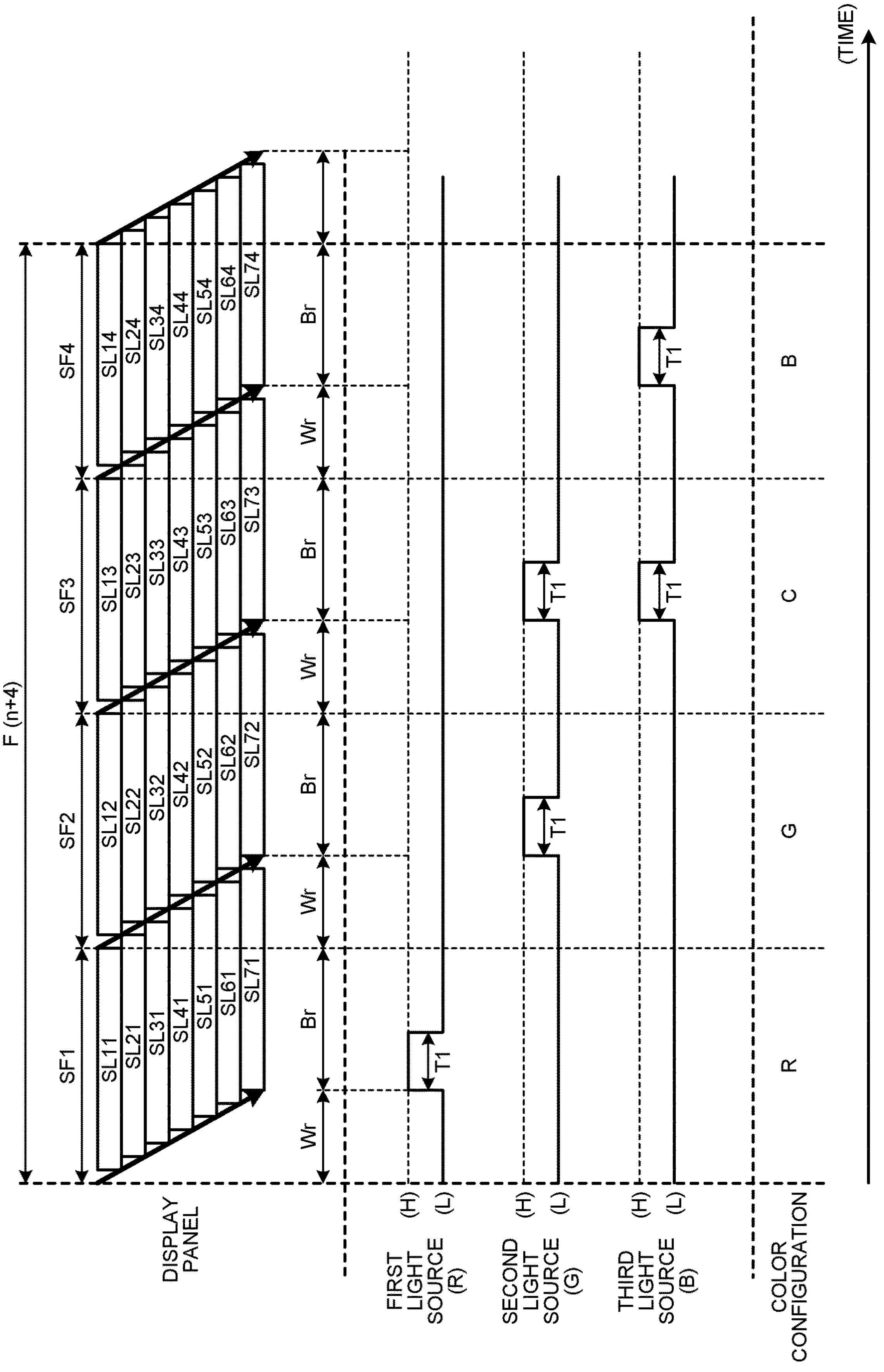
FIG. 13 is a diagram illustrating an example of lighting control of the first light source, the second light source, and the third light source during a frame period F(n+4)

FIG. 9 is a diagram illustrating an example of lighting control of the first light source 11R, the second light source 11G, and the third light source 11B during the frame period Fn. FIG. 10 is a diagram illustrating an example of lighting control of the first light source 11R, the second light source 11G, and the third light source 11B during the frame period F(n+1). FIG. 11 is a diagram illustrating an example of lighting control of the first light source 11R, the second light source 11G, and the third light source 11B during the frame period F(n+2). FIG. 12 is a diagram illustrating an example of lighting control of the first light source 11R, the second light source 11G, and the third light source 11B during the frame period F(n+3). FIG. 13 is a diagram illustrating an example of lighting control of the first light source 11R, the second light source 11G, and the third light source 11B during the frame period F(n+4). The examples from FIG. 9 to FIG. 13 correspond to the example in which the intermediate pattern 1, the intermediate pattern 2, and the intermediate pattern 3 are generated corresponding to the frame period F(n+1), the frame period F(n+2), and the frame period F(n+3) in a period of time during which the pattern is changed from the pattern 1 of the frame period Fn to the pattern 2 of the frame period F(n+4) described with reference to FIG. 8.

In the frame period Fn, the subframe lighting color transition controller 73 causes the liquid crystal control signal generator 75 and the light source control signal generator 76 to generate signals such that the display panel module DPM is operated corresponding to the pattern 1. The light source control signal generator 76 generates a control signal such that the colors of light during the subframe periods SF in the frame period Fn become the colors of light corresponding to the subframe-period lighting colors in the pattern 1 illustrated in FIG. 8.

More specifically, as illustrated in FIG. 9, the light source control signal generator 76 outputs a high (H) signal that turns ON the first light source 11R in the lighting period Br in the subframe period SF1 of the frame period Fn. Consequently, the color of light emitted from the light source device L in the subframe period SF1 becomes red (R).

As illustrated in FIG. 9, the light source control signal generator 76 also outputs high (H) signals that turn ON the first light source 11R and the second light source 11G in the lighting period Br in the subframe period SF2 of the frame period Fn. Consequently, the color of light emitted from the light source device L in the subframe period SF2 becomes yellow (Y).

As illustrated in FIG. 9, the light source control signal generator 76 also outputs a high (H) signal that turns ON the second light source 11G in the lighting period Br in the subframe period SF3 of the frame period Fn. Consequently, the color of light emitted from the light source device L in the subframe period SF3 becomes green (G).

As illustrated in FIG. 9, the light source control signal generator 76 also outputs a high (H) signal that turns ON the second light source 11G in the lighting period Br in the subframe period SF4 of the frame period Fn. Consequently, the color of light emitted from the light source device L in the subframe period SF4 becomes blue (B).

In this manner, a high (H) signal is output to at least one of the first light source 11R, the second light source 11G, and the third light source 11B in a period in which the lighting control is performed by operating the light source device L described with reference to FIG. 3, whereby the light corresponding to the subframe-period lighting color is emitted. In the writing period Wr, a low (L) signal is output to the first light source 11R, the second light source 11G, and the third light source 11B to turn OFF the light source device L.

In the first embodiment, the first light source 11R, the second light source 11G, and the third light source 11B are turned ON when a high (H) signal is supplied, and turned OFF when a low (L) signal is supplied. However, this is merely an example for describing high (H) and low (L) of the signal control, and the embodiment is not limited thereto. The relation between high (H) and low (L) and turning ON and turning OFF may be reversed. In this case, the transition of high (H) and low (L) indicated in FIG. 9 to FIG. 13 is reversed.

In the first embodiment, the light emission amounts of the first light source 11R, the second light source 11G, and the third light source 11B in the subframe periods SF are controlled by the length of light emission period corresponding to the period during which the high (H) signal is supplied (for example, a period T1 or a period T2). However, the embodiment is not limited thereto. In order to control the light emission amount of the first light source 11R, the second light source 11G, and the third light source 11B in the subframe periods SF, the light emission intensity may be controlled by controlling the amount of current supplied thereto. Alternatively, a combination of the control of the light emission period and the control of the light emission intensity may be performed to control the light emission amount.

In the frame period Fn described with reference to FIG. 9, a period during which the high (H) signal is supplied in each lighting period Br is the period T1.

Based on the subframe-period lighting colors applied in the frame period F by the subframe lighting color transition controller 73, the liquid crystal control signal generator 75 determines the gradation values indicated by the pixel signals included in the line image supplied to each line in the subframe periods SF.

For example, assume that the gradation value of the pixel signal supplied to a certain pixel Pix in the frame period Fn is (R, G, B)=(40, 30, 10). In this case, (R, G, B)=(rb, gb, bb)=(30, 30, 0) can be output as yellow (Y). The color component of red (R) obtained by subtracting (R, G, B)=(rb, gb, bb)=(30, 30, 0) from (R, G, B)=(40, 30, 10), is (R, G, B)=(ra, ga, ba)=(10, 0, 0). The color component of green (G) obtained by subtracting (R, G, B)=(rb, gb, bb)=(30, 30, 0) from (R, G, B)=(40, 30, 10), is (R, G, B)=(rc, gc, bc)=(0, 0, 0). The color component of blue (B) obtained by subtracting (R, G, B)=(rb, gb, bb)=(30, 30, 0) from (R, G, B)=(40, 30, 10), is (R, G, B)=(rd, gd, bd)=(0, 0, 10).

As illustrated in FIG. 9, the liquid crystal control signal generator 75 generates a pixel signal such that (ra, ga, ba) is written to the pixel Pix in the writing period Wr in the subframe period SF1. Thus, in the case of this example, the pixel signal corresponding to (ra, ga, ba) is included in one of the line images SL11, SL21, . . . , SL71 in the subframe period SF1 in the frame period Fn illustrated in FIG. 9. As illustrated in FIG. 9, the liquid crystal control signal generator 75 also generates a pixel signal such that (rb, gb, bb) is written to the pixel Pix in the writing period Wr in the subframe period SF2. Thus, in this example, the pixel signal corresponding to (rb, gb, bb) is included in one of the line images SL12, SL22, . . . , SL72 in the subframe period SF2 in the frame period Fn illustrated in in FIG. 9. With the same concept, as illustrated in FIG. 9, the liquid crystal control signal generator 75 generates a pixel signal such that (rc, gc, bc) is written to the pixel Pix in the writing period Wr in the subframe period SF3. As illustrated in FIG. 9, the liquid crystal control signal generator 75 also generates a pixel signal such that (rd, gd, bd) is written to the pixel Pix in the writing period Wr in the subframe period SF4.

By combining the generation of the pixel signal by the liquid crystal control signal generator 75 and the lighting control of the light source device L by the light source control signal generator 76 described above, red (R) is output in the subframe period SF1 of the frame period Fn, yellow (Y) is output in the subframe period SF2 of the frame period Fn, green (G) is output in the subframe period SF3 of the frame period Fn, and blue (B) is output in the subframe period SF4 of the frame period Fn, as illustrated in FIG. 9.

Hereinafter, in the descriptions on the frame period F(n+1) to the frame period F(n+4) with reference to FIG. 10 to FIG. 13, a difference from the control performed in the preceding frame period F will be specifically described.

The frame period F(n+1) in which the intermediate pattern 1 illustrated in FIG. 8 is applied, is different from the frame period Fn in that the color of the subframe period SF2 is the "color obtained by adding green to yellow (Y+G)". Thus, as illustrated in FIG. 10, in the period T1 in which the high (H) signals for turning ON the first light source 11R and the second light source 11G are supplied in the lighting period Br included in the subframe period SF2 of the frame period F(n+1), the light source control signal generator 76 sets the lighting period of the first light source 11R to be the period T2. The period T2 is half of the period T1. Consequently, the color of light emitted from the light source device L in the subframe period SF2 becomes yellow (Y) in the period T2 and becomes green (G) in a period obtained by excluding the period T2 from the period T1. Thus, the color of light emitted from the light source device L in the subframe period SF2 becomes the "color obtained by adding green to yellow (Y+G)".

In a similar manner to the above, the liquid crystal control signal generator 75 determines the gradation values indicated by the pixel signals included in the line image supplied to each line in each subframe period SF, based on the subframe-period lighting color applied in each frame period F by the subframe lighting color transition controller 73. However, in the frame period F(n+1) in this example and thereafter, a different pattern is employed from that in the frame period Fn. Thus, the gradation value of at least one pixel signal among the pixel signals indicated by the input signal I is also changed.

For example, assume that the gradation value of the pixel signal supplied to a certain pixel Pix in the frame period F(n+1) is (R, G, B)=(10, 70, 30). In this case, (R, G, B)=(0, 30, 30) can be output as cyan (C), but the mixed color in the colors of light emitted in the frame period F(n+1) in which the intermediate pattern 1 is applied, is yellow (Y). Therefore, it is possible to output (R, G, B)=(rf, gf, bf)=(10, 10, 0) as yellow (Y). The color component of red (R) obtained by subtracting (R, G, B)=(rf, gf, bf)=(10, 10, 0) from (R, G, B)=(10, 70, 30), is (R, G, B)=(re, ge, be)=(0, 0, 0). The color component of green (G) obtained by subtracting (R, G, B)=gf, bf)=(10, 10, 0) from (R, G, B)=(10, 70, 30), is (R, G, B)=(rg, gg, bg)=(0, 60, 0). The color component of blue (B) obtained by subtracting (R, G, B)=(rf, gf, bf)=(10, 10, 0) from (R, G, B)=(10, 70, 30), is (R, G, B)=(rh, gh, bh)=(0, 0, 30).

As illustrated in FIG. 9, the liquid crystal control signal generator 75 generates a pixel signal such that (ra, ga, ba) is written to the pixel Pix in the writing period Wr in the subframe period SF1. However, in the frame period F in which one of the intermediate patterns is applied, the gradation value corresponding to the color component included in the color of light to be emitted in the subframe period SF in which the color of illumination light is changed from that in the immediately preceding frame, is corrected in accordance with the light emission amount. The liquid crystal control signal generator 75 outputs the pixel signal after performing the correction.

In the case of the examples illustrated in FIG. 9 and FIG. 10, the color of light in the subframe period SF2 is yellow (Y) in the frame period Fn, but is changed to the "color obtained by adding green to yellow (Y+G)" in the frame period F(n+1). In this example, the light emission amount of yellow (Y) in the subframe period SF2 in the frame period F(n+1) is half of that in the frame period Fn. The light emission amount of green (G) in the frame period F(n+1) is 1.5 times greater than that in the frame period Fn. This is because the light emission amount in a period obtained by excluding the period T2 from the period T1 in the subframe period SF2 is added to the light emission amount in the subframe period SF3. Therefore, to perform an output corresponding to (R, G, B)=(rf, gf, bf)=(10, 10, 0) with yellow (Y) the light emission amount of which is reduced by half, the liquid crystal control signal generator 75 multiplies (rf, gf, bf) by 2 to set (R, G, B)=(ri, gi, bi)=(20, 20, 0). The liquid crystal control signal generator 75 also distributes the pixel signal such that (R, G, B)=(rj, gj, bj)=(0, 20, 0), which is a third of (R, G, B)=(rg, gg, bg)=(0, 60, 0), is allocated to the subframe period SF2, and that (R, G, B)=(rk, gk, bk)=(0, 40, 0), which is the remaining two third, is allocated to the subframe period SF3. Consequently, the gradation value of the pixel signal supplied to the pixel Pix in the subframe period SF2 becomes (R, G, B)=(20, 40, 0) that is obtained by adding (R, G, B)=(ri, gi, bi)=(20, 20, 0) and (R, G, B)=(rj, gj, bj)=(0, 20, 0). The gradation value of the pixel signal supplied to the pixel Pix in the subframe period SF3 becomes (R, G, B)=(rk, gk, bk)=(0, 40, 0).

In the subframe period SF1 and the subframe period SF4 in which the lighting period is the period T1, the pixel signal is also output in the frame period F(n+1) in the similar way to that in the frame period Fn described with reference to FIG. 9. Thus, the pixel signal corresponding to (re, ge, be) is included in one of the line images SL11, SL21, SL71 in the subframe period SF1 in the frame period F(n+1) illustrated in FIG. 10. The pixel signal corresponding to (rh, gh, bh) is also included in one of the line images SL11, SL21, . . . , SL71 in the subframe period SF4 in the frame period F(n+1) illustrated in FIG. 10.

However, when the gradation value corresponding to the color of light, the lighting amount of which is reduced by half from the preceding frame, is multiplied by 2, and the resultant color exceeds the upper limit for the gradation value to be supplied to the pixel Pix, the amount of the gradation value exceeding the upper limit is distributed to the subframe period SF in which the light in color corresponding to the gradation value is emitted. For example, assume that there is a pixel Pix supplied with the color component corresponding to the gradation value of yellow (Y) of (R, G, B)=(130, 130, 0) in the frame period F(n+1). In this assumption, also assume that the gradation value is 8 bits, and the maximum value is 255. In this case, when the color component is multiplied by 2, (R, G, B)=(260, 260, 0) is obtained, and the gradation value of red (R) and the gradation value of green (G) exceed the maximum value. Thus, the liquid crystal control signal generator 75 supplies the maximum value (R, G, B)=(255, 255, 0) of the gradation value (R, G, B)=(260, 260, 0) obtained by multiplying the original value by 2, to pixel Pix with in the subframe period SF2. The liquid crystal control signal generator 75 also adds a red (R) component (R, G, B)=(5, 0, 0) to the gradation value of the pixel signal to be supplied to the pixel Pix in the subframe period SF1. The red (R) component (R, G, B)=(5, 0, 0) corresponds to the color component of red (R) in (R, G, B)=(5, 5, 0) obtained by subtracting the maximum value (R, G, B)=(255, 255, 0) from the gradation value (R, G, B)=(260, 260, 0) obtained by multiplying the original value by 2. The liquid crystal control signal generator 75 also adds a green (G) component (R, G, B)=(0, 5, 0) to the gradation value of the pixel signal to be supplied to the pixel Pix in the subframe period SF3. The green (G) component (R, G, B)=(0, 5, 0) corresponds to the color component of green (G) in (R, G, B)=(5, 5, 0) obtained by subtracting the maximum value (R, G, B)=(255, 255, 0) from the gradation value (R, G, B)=(260, 260, 0) obtained by multiplying the original value by 2. A case of yellow (Y) has been described above as an example. However, the same concept is also applicable to a case where the color exceeding the upper limit of the gradation value to be supplied to the pixel Pix is generated when the gradation value of the other color is multiplied by 2.

The frame period F(n+2) in which the intermediate pattern 2 illustrated in FIG. 8 is applied, is different from the frame period F(n+1) in that the color of the subframe period SF2 is green (G). Thus, as illustrated in FIG. 11, the light source control signal generator 76 sets the second light source 11G as a light source to which a high (H) signal is supplied during the period T1 in the lighting period Br included in the subframe period SF2 of the frame period F(n+2), and causes a low (L) signal to be supplied to the first light source 11R to which the high (H) signal has been supplied during the period T2 in the frame period F(n+1). Consequently, the color of light to be emitted from the light source device L in the subframe period SF2 becomes green (G).

As described above, in the frame period F(n+2) in which the intermediate pattern 2 is applied, the liquid crystal control signal generator 75 also corrects, in accordance with the light emission amount, the gradation value corresponding to the color component included in the color of light to be emitted in the subframe period SF in which the color of illumination light is changed from the immediately preceding frame.

The frame period F(n+2) described with reference to FIG. 11 includes two subframe periods SF of the subframe period SF2 and the subframe period SF3 serving as the subframe period SF in which light in green (G) is ON during the period T1. Thus, the liquid crystal control signal generator 75 divides the gradation value of the color component of green (G) included in the pixel signal to be supplied to the pixels Pix in the frame period F(n+2) into two pieces and supplies the divided gradation values to the subframe period SF2 and the subframe period SF3, respectively. For example, when the pixel Pix to be supplied with a pixel signal of (R, G, B)=(0, 20, 0) is in the frame period F(n+2), a pixel signal of (R, G, B)=(0, 10, 0) is supplied to the pixel Pix in the subframe period SF2, and a pixel signal of (R, G, B)=(0, 10, 0) is supplied in the subframe period SF3.

The frame period F(n+3) in which the intermediate pattern 3 illustrated in FIG. 8 is applied, is different from the frame period F(n+2) in that the color of the subframe period SF3 becomes "color obtained by adding cyan to green (G+C)". Thus, as illustrated in FIG. 12, the light source control signal generator 76 supplies a high (H) signal that turns ON the second light source 11G and the third light source 11B in the lighting period Br in the subframe period SF3 of the frame period F(n+3). In this example, the lighting period of the second light source 11G is the period T1, and the lighting period of the third light source 11B is the period T2. Consequently, the color of light emitted from the light source device L in the subframe period SF3 becomes cyan (C) in the period T2, and becomes green (G) in a period obtained by excluding the period T2 from the period T1. Thus, the color of light emitted from the light source device L in the subframe period SF3 becomes the "color obtained by adding cyan to green (G+C)".

As described above, in the frame period F(n+3) in which the intermediate pattern 3 is applied, the liquid crystal control signal generator 75 also corrects, in accordance with the light emission amount, the gradation value corresponding to the color component included in the color of light to be emitted in the subframe period SF in which the color of illumination light is changed from the immediately preceding frame. The specific concept is the same as that in the frame period F(n+1) described above except that the color of the gradation value to be corrected is cyan (C) and green, and the detailed description thereof will be omitted.

The frame period F(n+4) in which the pattern 2 illustrated in FIG. 8 is applied, is different from the frame period F(n+3) in that the color of the subframe period SF3 becomes cyan (C). Thus, as illustrated in FIG. 13, the light source control signal generator 76 sets each of the periods during which a high (H) signals for turning ON the second light source 11G and the third light source 11B are supplied in the lighting period Br included in the subframe period SF3 of the frame period F(n+4) to be the period T1. Consequently, the color of light emitted from the light source device L in the subframe period SF3 becomes cyan (C).

The frame period F(n+4) in which the pattern 2 is applied does not correspond to the frame period F in which any one of the intermediate patterns is applied. Hence, the correction will not be performed for the frame period F(n+4), and, with the same concept as that of the frame period Fn, the light source control signal generator 76 performs the allocation of the gradation value corresponding to the subframe-period lighting color of each subframe period SF. However, while the color component other than the primary color components is yellow (Y) in the frame period Fn, the color component other than the primary color components is cyan (C) in the frame period F(n+4). Hence, the liquid crystal control signal generator 75 allocates the color component that can be converted to cyan (C) in the gradation value indicated by the pixel signal, to the subframe period SF3.

In the first embodiment, as illustrated in FIG. 1, a synchronization control signal is also output from the image signal controller 70 to the timing controller 13. However, the liquid crystal control signal generator 75 may output the synchronization control signal with a pixel signal, or a dedicated circuit may output the synchronization control signal. The synchronization control signal is a signal for matching the output timing of the pixel signal from the signal output circuit 8 and the output timing of the drive signal from the scanning circuit 9.

In general, when the pattern employed by the subframe display order determiner 72 is changed between the n-th frame period Fn and the (n+1)-th frame period F(n+1), the color of the frame image seldom changes such that the pattern employed by the subframe display order determiner 72 is also changed in the (n+2)-th frame period F(n+2). Thus, in general, the pattern employed by the subframe display order determiner 72 for the frame period F(n+1) is successively employed for the (n+4)-th frame period F(n+4) and thereafter. In the first embodiment, in view of such tendency, priority is given to reducing the occurrence of a flicker on the image by smoothly changing the color of the subframe period SF corresponding to the pattern employed for the (n+1)-th frame period F(n+1). If, at timing prior to the frame period F (for example, (n+4)-th frame period F(n+4)) in which the color change control corresponding to the change of the pattern to be employed by the subframe display order determiner 72 is to be completed, the pattern employed by the subframe display order determiner 72 is changed again, the control for adjusting the colors to the re-changed pattern may be started from that timing. Alternatively, the control for adjusting the colors to the re-changed pattern may be started after the application of the pattern employed by the subframe display order determiner 72 to the frame period F(n+1) is completed. The latter can further reduce the occurrence of a flicker on the image.

An example of transition from the pattern 1 to the pattern 2 has been described above with reference to FIG. 8 to FIG. 13. However, the basic concept of transition relating to other patterns is also the same.

FIG. 14 is a diagram illustrating another example of subframe-period lighting colors of each frame period F, in a case of gradually changing the color of the subframe period SF, the color of which is changed before and after the change in pattern. When the subframe display order determiner 72 employs the pattern 3 for the n-th frame period Fn and employs the pattern 4 for the (n+1)-th frame period F(n+1), the subframe lighting color transition controller 73 generates the frame periods F assigned intermediate patterns for gradually changing the color of the subframe period SF, the color of which is changed before and after the change in pattern, before the frame period F in which the colors of the subframe periods SF corresponding to the pattern 4 are output, that is, between the frame period F corresponding to the pattern 3 and the frame period F corresponding to the pattern 4.

More specifically, as illustrated in FIG. 14, for the n-th frame period Fn, the subframe lighting color transition controller 73 follows the pattern 3, and sets the color of the subframe period SF1 to red (R), sets the color of the subframe period SF2 to green (G), sets the color of the subframe period SF3 to blue (B), and sets the color of the subframe period SF4 to magenta (M).

Next, for the (n+1)-th frame period F(n+1), the subframe lighting color transition controller 73 employs an intermediate pattern 4 in which the color of the subframe period SF1 is set to red (R), the color of the subframe period SF2 is set to green (G), the color of the subframe period SF3 is set to blue (B), and the color of the subframe period SF4 is set to "color obtained by adding red to magenta (M+R)".

Next, for the (n+2)-th frame period F(n+2), the subframe lighting color transition controller 73 employs an intermediate pattern 5 in which the color of the subframe period SF1 is set to red (R), the color of the subframe period SF2 is set to green (G), the color of the subframe period SF3 is set to blue (B), and the color of the subframe period SF4 is set to red (R).

Next, for the (n+3)-th frame period F(n+3), the subframe lighting color transition controller 73 employs an intermediate pattern 6 in which the color of the subframe period SF1 is set to "color obtained by adding white to red (R+W)", the color of the subframe period SF2 is set to green (G), the color of the subframe period SF3 is set to blue (B), and the color of the subframe period SF4 is set to red (R).

When white (W) is added, the light sources of the light source device L corresponding to primary colors (for example, green (G) and blue (B)) other than a primary color required for outputting the color to which white (W) is added (for example, red (R)), are ON during the period T2. When the color corresponding to a mixed color and the color corresponding to a primary color are added, the light source of the light source device L corresponding to the primary color is ON during the period T1, and the light source of the light source device L for emitting the color to be combined with the primary color to reproduce the mixed color is ON during the period T2.

For the (n+4)-th frame period F(n+4), the subframe lighting color transition controller 73 sets the color of the subframe period SF1 to white (W), sets the color of the subframe period SF2 to green (G), sets the color of the subframe period SF3 to blue (B), and sets the color of the subframe period SF4 to red (R), thereby causing the pattern 4 to be in an employed state. In this example, in the pattern 4 employed for the frame period F(n+4) illustrated in FIG. 14, the order of colors of the subframe periods SF is white (W), green (G), blue (B), and red (R). However, white (W) is not the color arranged along the clockwise direction OD1 nor the counterclockwise direction OD2 in the hue circle 200, and thus the order of colors of the subframe periods SF does not contradict the order in the counterclockwise direction OD2 in the hue circle 200. That is, white (W) does not conform to the definition of the order of colors in the hue circle 200.

However, in the first embodiment, the order is controlled such that white (W) is in the subframe period SF between red (R) and green (G), in the subframe period SF immediately before green (G), or in the subframe period SF immediately after red (R).

In this example, when the frame period F including the subframe period SF in which another color component is output is a "first frame period", the first frame period in the example illustrated in FIG. 14 is the (n+3)-th frame period F(n+3). When the frame period F after the first frame period is a second frame period, the second frame period in the example illustrated in FIG. 14 is the (n+4)-th frame period F(n+4). When, among a predetermined number (m) of the subframe periods SF in the first frame period, the "subframe period at a certain position in the sequence" is a subframe period SF in which the "other color component" is output, the "subframe period at a certain position in the sequence" in the example illustrated in FIG. 14 is the first subframe period SF1, and the "other color component" in the example illustrated in FIG. 14 is "color obtained by adding white to red (R+W)". According to the above, in the example illustrated in FIG. 14, the "subframe period at a certain position in the sequence" in the second frame period, that is, the subframe period F1 in the (n+4)-th frame period F(n+4) is the subframe period SF in which a "color component different from the other color component" is output. In this example, the "color component different from the other color component" in the example illustrated in FIG. 14 is the color component of white (W).

FIG. 15 is a diagram illustrating another example of subframe-period lighting colors of each frame period F, in a case of gradually changing the color of the subframe period SF, the color of which is changed before and after the change in pattern. When the subframe display order determiner 72 employs the pattern 1 for the n-th frame period Fn and employs the pattern 4 for the (n+1)-th frame period F(n+1), the subframe lighting color transition controller 73 generates the frame period F assigned an intermediate pattern for gradually changing the color of the subframe period SF, the color of which is changed before and after the change in pattern, before the frame period F in which the colors of the subframe periods SF corresponding to the pattern 4 are output, that is, between the frame period F corresponding to the pattern 1 and the frame period F corresponding to the pattern 4.

More specifically, as illustrated in FIG. 15, for the n-th frame period Fn, the subframe lighting color transition controller 73 follows the pattern 1, and sets the color of the subframe period SF1 to red (R), sets the color of the subframe period SF2 to yellow (Y), sets the color of the subframe period SF3 to green (G), and sets the color of the subframe period SF4 to blue (B).

Next, for the (n+1)-th frame period F(n+1), the subframe lighting color transition controller 73 employs an intermediate pattern 7 in which the color of the subframe period SF1 is set to red (R), the color of the subframe period SF2 is set to "color obtained by adding white to yellow (Y+W)", the color of the subframe period SF3 is set to green (G), and the color of the subframe period SF4 is set to blue (B).

Then, for the (n+2)-th frame period F(n+2), the subframe lighting color transition controller 73 sets the color of the subframe period SF1 to white (W), sets the color of the subframe period SF2 to green (G), sets the color of the subframe period SF3 to blue (B), and sets the color of the subframe period SF4 to red (R), thereby causing the pattern 4 to be in an employed state. In this manner, in the first embodiment, when a combination of different colors in the patterns employed for the n-th frame period Fn and for the (n+1)-th frame period F(n+1) by the subframe display order determiner 72 is a combination of yellow (Y) and white (W), only one intermediate pattern is required.

When the pattern before the change and the pattern after the change described with reference to FIG. 8, FIG. 14, FIG. 15, and other figures are reversed, the control is performed such that the order in the frame period F illustrated in each figures is reversed. Even when the combination of the pattern before the change and the pattern after the change is a combination of patterns that are not illustrated, the concept of the control is the same as that described with reference to FIG. 8 to FIG. 15.

As described above, in the first embodiment, the display panel (for example, the display panel P) that displays an image using the light from outside the display panel, and the light source 11 that emits light to the display panel are provided. The light source 11 includes the first light source 11R that emits light in the first primary color, the second light source 11G that emits light in the second primary color, and the third light source 11B that emits light in the third primary color. The frame period F that is a display period of one frame image includes a predetermined number (m) of subframe periods SF, and m is four or greater. Color reproduction of one frame image is performed by the combination of colors output in the predetermined number of subframe periods SF. The output order of colors of the subframe periods SF is in the order of colors in the clockwise direction OD1 or in the counterclockwise direction OD2 in the hue circle 200. Consequently, it is possible to reduce the occurrence of color breakup due to a change in the colors between the subframe periods SF. Thus, it is possible to further reduce the occurrence of a flicker on the image.

When the mixed color component of each of the frame images to be displayed successively on the display panel (for example, the display panel P) is transitioned from the first mixed color component to the second mixed color component, and the frame period F prior to the transition includes the subframe period SF in which the first mixed color component is output, the frame period F including the subframe period SF in which another color component between the first mixed color component and the second mixed color component in the hue circle 200 is output, is generated before the frame period F that is subsequent to the transition and that includes the subframe period SF in which the second mixed color component is output. Consequently, even if the combinations of colors of the subframe periods SF may need to be changed between the successive frame periods F, it is possible, by smoothly changing the color of the subframe period SF between the frame periods F, to reduce the occurrence of a flicker on the image.

The first primary color is red (R), the second primary color is green (G), and the third primary color is blue (B). Consequently, it is possible to output colors using light sources that output general colors.

The frame period F includes at least the subframe period SF in which the first primary color is output, the subframe period SF in which the second primary color is output, and the subframe period SF in which the third primary color is output. The color that is output in one subframe period SF of the other subframe periods SF included in the frame period F is yellow (Y), cyan (C), magenta (M) or white (W). Consequently, it is possible to output variety of colors using the light in mixed color or white (W).

The color that is output in each of the other subframe periods SF corresponds to the color component having a larger proportion among the mixed color components and the white color component included in the frame image to be displayed in the frame period F including the other subframe period SF. By including such a subframe period SF, it is possible to further reduce the occurrence of color breakup.

When the mixed color component, which is contained most in the color of each of the frame images to be displayed successively on the display panel (for example, the display panel P), is transitioned from the mixed color component other than white (W) to white (W), and the frame period F prior to the transition includes the subframe period SF in which the mixed color component other than white (W) is output, the frame period F including the subframe period SF in which the color component obtained by making the mixed color component other than white (W) closer to white (W) is output is generated before the frame period F that is subsequent to the transition and that includes the subframe period SF in which white (W) is output. Consequently, even if the subframe period SF in which white (W) is output is included, it is possible to reduce the occurrence of a flicker on the image, by smoothly changing the color of the subframe period SF between the frame periods F.

Each of the subframe periods SF includes the writing period Wr in which pixel signals are written to the pixels Pix provided in the display panel (for example, the display panel P), and the lighting period Br that is a period after the writing period Wr and in which the light source 11 is turned ON. Consequently, the FSC method can be implemented by emitting the light in color corresponding to the pixel signal written in the writing period Wr, to the display panel in the lighting period Br.

The display panel P is a display panel in which polymer-dispersed liquid crystals (for example, the liquid crystals 3) are sealed between the two substrates facing each other (for example, the second substrate 20 and the first substrate 30). Consequently, it is possible to reduce the occurrence of a flicker on the image in the FSC display device using the polymer-dispersed liquid crystal.

In the first embodiment described above, the subframe display order determiner 72 sets the colors output in the three subframe periods SF in the m subframe periods SF included in one frame period F to the first primary color, the second primary color, and the third primary color. However, the embodiment is not limited thereto. Hereinafter, a modification in which the subframe display order determiner 72 does not limit the colors output in the three subframe periods SF in the m subframe periods SF included in one frame period F to the first primary color, the second primary color, and the third primary color will be described with reference to FIG. 16. In the description of the modification, the same reference numerals denote the same items as those in the first embodiment, and the description thereof may be omitted.

FIG. 16 is a diagram illustrating a relation between the color components in the subframe periods SF and the order of colors in the hue circle 200 in a modification. In FIG. 16, an example of a flow of time corresponding to the order of colors of the subframe periods SF is indicated in a solid line arrow. In FIG. 16, another example of a flow of time corresponding to the order of colors of the subframe periods SF is indicated in a broken line arrow.

In the example illustrated in FIG. 16, the subframe-period lighting color of the subframe period SF1 corresponds to a color pattern CP1, for example. The color pattern CP1 is light in mixed color including the color components of red (R), green (G), and blue (B), in which blue (B) is the strongest, red (R) is the weakest, and green (G) is in the middle.

In the example illustrated in FIG. 16, the subframe-period lighting color of the subframe pattern SF2 corresponds to a color pattern CP2. The color pattern CP2 is light in mixed color including the color components of red (R), green (G), and blue (B), in which green (G) is the strongest, red (R) is the weakest, and blue (B) is in the middle.

In the example illustrated in FIG. 16, the subframe-period lighting color of the subframe period SF3 corresponds to a color pattern CP3. The color pattern CP3 is light in mixed color including the color components of red (R), green (G), and blue (B), in which green (G) is the strongest, blue (B) is the weakest, and red (R) is in the middle.

In the example illustrated in FIG. 16, the subframe-period lighting color of the subframe period SF4 corresponds to a color pattern CP4. The color pattern CP3 is light in mixed color including the color components of red (R), green (G), and blue (B), in which red (R) is the strongest, green (G) is the weakest, and blue (B) is in the middle.

As illustrated by an arrow A1 in the hue circle 200, the color pattern CP1 corresponds to the position close to blue (B) in cyan (C). As illustrated by an arrow A2 in the hue circle 200, the color pattern CP2 corresponds to the position close to green (G) in cyan (C). As illustrated by an arrow A3 in the hue circle 200, the color pattern CP3 corresponds to the position close to green (G) in yellow (Y). As illustrated by an arrow A4 in the hue circle 200, the color pattern CP4 corresponds to the position close to red (R) in magenta (M). Thus, the order of the color pattern CP1, the color pattern CP2, the color pattern CP3, and the color pattern CP4 is in the clockwise direction OD1 in the hue circle 200.

As illustrated as another example, the order of the color pattern CP1, the color pattern CP2, the color pattern CP3, and the color pattern CP4 may be reversed from the example. That is, the subframe-period lighting color during the subframe period SF1 may correspond to the color pattern CP4, the subframe-period lighting color during the subframe period SF2 may correspond to the color pattern CP3, the subframe-period lighting color during the subframe period SF3 may correspond to the color pattern CP2, and the subframe-period lighting color during the subframe period SF4 may correspond to the color pattern CP1. In this case, the order of the color pattern CP4, the color pattern CP3, the color pattern CP2, and the color pattern CP1 is in the counterclockwise direction OD2 in the hue circle 200.

Like the color pattern CP1, the color pattern CP2, the color pattern CP3, and the color pattern CP4 described above, the subframe display order determiner 72 in the modification employs the light in color not limited to the primary color, as the color of light of each of the subframe periods SF. In a similar manner to the first embodiment, the subframe lighting color transition controller 73 controls the subframe-period lighting colors of the frame periods F in accordance with the presence or absence of constraints. In a similar manner to the first embodiment, the light source control signal generator 76 generates a control signal such that the light source device L emits the light in color that has been set as the subframe-period lighting color by the subframe lighting color transition controller 73. In a similar manner to the first embodiment, the liquid crystal control signal generator 75 determines the gradation value such that the output corresponds to the color of light emitted in each subframe period SF.

Specifically, in the modification, the light emitted in the subframe periods SF may be a mixed color. Hence, the color components indicated by the gradation values of red (R), green (G), and blue (B) included in the pixel signal are also distributed to the subframe periods SF in which the mixed color is emitted. The distribution degree corresponds to the strength of each primary color included in the light emitted in the subframe period SF. In the modification, the light emission amount of the primary color component included in each subframe period SF is a variable light emission amount that is not controlled by a fixed light emission period such as the period T1 and the period T2. Thus, the liquid crystal control signal generator 75 corrects, as needed, the gradation value to be supplied to each pixel Pix by the pixel signal such that the output by the display panel P corresponding to the gradation value indicated by the input signal I is performed under the condition in which the light in the primary color component with such variable light emission amount is emitted. More particularly, when the light emission amount of the primary color component in the frame period F is not a "predetermined light emission amount corresponding to the period T1", the liquid crystal control signal generator 75 calculates a value obtained by reversing the "ratio between the light emission amount of the primary color component and the predetermined light emission amount", as a correction coefficient. The liquid crystal control signal generator 75 corrects the gradation value of the primary color component by multiplying the gradation value by the correction coefficient.

Each of the color patterns CP1, CP2, CP3, and CP4 described with reference to FIG. 16 is merely an example of a mixed color that can be employed as the color of the subframe period SF in the modification. The mixed color that can be employed as the color of the subframe period SF in the modification is not limited to the color patterns CP1, CP2, CP3, and CP4, and any mixed color may be employed. A part of the colors of the subframe periods SF in the modification may also be a primary color, a mixed color of the primary colors, or white (W). In the first embodiment and the modification, it is only required that the output order of colors of the subframe periods SF is in the order of colors in the clockwise direction OD1 or in the counterclockwise direction OD2 in the hue circle 200.

According to the modification as described above, it is possible, by distributing the primary color component to the subframe periods SF, to reduce the probability of occurrence of extreme change in the color component due to the change in colors between the successive frame periods F. Thus, it is possible to further reduce the occurrence of color breakup, and further reduce the occurrence of a flicker on the image due to the color breakup.

The number of subframe periods is not limited to a case where m=4, and may be a case where m=5 or a case where m=6. Hereinafter, a second embodiment in a case where m=5 will be described with reference to FIG. 17 to FIG. 21. A third embodiment in a case where m=6 will also be described with reference to FIG. 22 to FIG. 24. In the descriptions of the second embodiment and the third embodiment, the same reference numerals denote the same items as those in the first embodiment, and the description thereof may be omitted.

Second Embodiment

FIG. 17 is a diagram illustrating combinations of colors of the subframe periods SF that may occur when m=5. In the second embodiment, the combination of colors determined by the subframe display order determiner 72 is a pattern 11, a pattern 12, a pattern 13, a pattern 14, a pattern 15, or a pattern 16 illustrated in FIG. 17. The pattern 11 is a pattern in which the first color is red (R), the second color is yellow (Y), the third color is green (G), the fourth color is cyan (C), and the fifth color is blue (B). The pattern 12 is a pattern in which the first color is red (R), the second color is yellow (Y), the third color is green (G), the fourth color is blue (B), and the fifth color is magenta (M). The pattern 13 is a pattern in which the first color is red (R), the second color is yellow (Y), the third color is white (W), the fourth color is green (G), and the fifth color is blue (B). The pattern 14 is a pattern in which the first color is red (R), the second color is white (W), the third color is green (G), the fourth color is cyan (C), and the fifth color is blue (B). The pattern 15 is a pattern in which the first color is red (R), the second color is green (G), the third color is cyan (C), the fourth color is blue (B), and the fifth color is magenta (M). The pattern 16 is a pattern in which the first color is red (R), the second color is white (W), the third color is green (G), the fourth color is blue (B), and the fifth color is magenta (M).

In a similar manner to the first embodiment, the subframe lighting color transition controller 73 in the second embodiment controls the color transition orders of the subframe periods SF in each frame period F, based on the combinations of colors of the subframe periods SF determined by the subframe display order determiner 72. Hereinafter, an example of the control of the subframe-period lighting color performed in the second embodiment when the constraint described above is imposed, will be described with reference to FIG. 18 to FIG. 21. The concept of the control performed for the combination of the patterns described with reference to FIG. 18 to FIG. 21 is applicable to any combination other than the combination.

FIG. 18 is a diagram illustrating an example of subframe-period lighting colors in each frame period F, in a case of gradually changing the color of the subframe period SF in the second embodiment. When the subframe display order determiner 72 employs the pattern 12 for the n-th frame period Fn and employs the pattern 14 for the (n+1)-th frame period F(n+1), the subframe lighting color transition controller 73 generates the frame periods F assigned intermediate patterns for gradually changing the color of the subframe period SF, the color of which is changed before and after the change in pattern, before the frame period F in which the colors of the subframe periods SF corresponding to the pattern 14 are output, that is, between the frame period F corresponding to the pattern 12 and the frame period F corresponding to the pattern 14.

More specifically, as illustrated in FIG. 18, for the n-th frame period Fn, the subframe lighting color transition controller 73 follows the pattern 12, and sets the color of the subframe period SF1 to red (R), sets the color of the subframe period SF2 to yellow (Y), sets the color of the subframe period SF3 to green (G), sets the color of the subframe period SF4 to blue (B), and sets the color of the subframe period SF5 to magenta (M).

Next, for the (n+1)-th frame period F(n+1), the subframe lighting color transition controller 73 employs an intermediate pattern 11 in which the color of the subframe period SF1 is set to red (R), the color of the subframe period SF2 is set to "color obtained by adding green to yellow (Y+G)", the color of the subframe period SF3 is set to green (G), the color of the subframe period SF4 is set to blue (B), and the color of the subframe period SF5 is set to magenta (M).

Next, for the (n+2)-th frame period F(n+2), the subframe lighting color transition controller 73 employs an intermediate pattern 12 in which the color of the subframe period SF1 is set to red (R), the color of the subframe period SF2 is set to green (G), the color of the subframe period SF3 is set to green (G), the color of the subframe period SF4 is set to blue (B), and the color of the subframe period SF5 is set to magenta (M).

Next, for the (n+3)-th frame period F(n+3), the subframe lighting color transition controller 73 employs an intermediate pattern 13 in which the color of the subframe period SF1 is set to red (R), the color of the subframe period SF2 is set to green (G), the color of the subframe period SF3 is set to "color obtained by adding cyan to green (G+C)", the color of the subframe period SF4 is set to blue (B), and the color of the subframe period SF5 is set to magenta (M).

Then, for the (n+4)-th frame period F(n+4), the subframe lighting color transition controller 73 sets the color of the subframe period SF1 to red (R), sets the color of the subframe period SF2 to green (G), sets the color of the subframe period SF3 to cyan (C), sets the color of the subframe period SF4 to blue (B), and sets the color of the subframe period SF5 to magenta (M), thereby causing the pattern 14 to be in an employed state.

FIG. 19 is a diagram illustrating another example of subframe-period lighting colors in each frame period F, in a case of gradually changing the color of the subframe period SF in the second embodiment. For example, when the subframe display order determiner 72 employs the pattern 11 for the n-th frame period Fn and employs the pattern 15 for the (n+1)-th frame period F(n+1), the subframe lighting color transition controller 73 generates the frame periods F assigned intermediate patterns for gradually changing the color of the subframe period SF, the color of which is changed before and after the change in pattern, before the frame period F in which the colors of the subframe periods SF corresponding to the pattern 15 are output, that is, between the frame period F corresponding to the pattern 11 and the frame period F corresponding to the pattern 15.

More specifically, as illustrated in FIG. 19, for the n-th frame period Fn, the subframe lighting color transition controller 73 follows the pattern 11, and sets the color of the subframe period SF1 to red (R), sets the color of the subframe period SF2 to yellow (Y), sets the color of the subframe period SF3 to green (G), sets the color of the subframe period SF4 to cyan (C), and sets the color of the subframe period SF5 to blue (B).

Next, for the (n+1)-th frame period F(n+1), the subframe lighting color transition controller 73 employs an intermediate pattern 14 in which the color of the subframe period SF1 is set to red (R), the color of the subframe period SF2 is set to "color obtained by adding red to yellow (Y+R)", the color of the subframe period SF3 is set to green (G), the color of the subframe period SF4 is set to cyan (C), and the color of the subframe period SF5 is set to blue (B).

Next, for the (n+2)-th frame period F(n+2), the subframe lighting color transition controller 73 employs an intermediate pattern 15 in which the color of the subframe period SF1 is set to red (R), the color of the subframe period SF2 is set to red (R), the color of the subframe period SF3 is set to green (G), the color of the subframe period SF4 is set to cyan (C), and the color of the subframe period SF5 is set to blue (B).

Next, for the (n+3)-th frame period F(n+3), the subframe lighting color transition controller 73 employs an intermediate pattern 16 in which the color of the subframe period SF1 is set to "color obtained by adding magenta to red (R+M)", the color of the subframe period SF2 is set to red (R), the color of the subframe period SF3 is set to green (G), the color of the subframe period SF4 is set to cyan (C), and the color of the subframe period SF5 is set to blue (B).

Then, for the (n+4)-th frame period F(n+4), the subframe lighting color transition controller 73 sets the color of the subframe period SF1 to magenta (M), sets the color of the subframe period SF2 to red (R), sets the color of the subframe period SF3 to green (G), sets the color of the subframe period SF4 to cyan (C), and sets the color of the subframe period SF5 to blue (B), thereby causing the subframe-period lighting colors corresponding to the pattern 15 to be in an employed state. In the pattern 15 illustrated in FIG. 19 and FIG. 21, which will be described later, the order of colors of the subframe periods SF is magenta (M), red (R), green (G), cyan (C), and blue (B), and is in the counterclockwise direction OD2 in the hue circle 200.

In this example, when the frame period F including the subframe period SF in which another color component is output is referred to as the "first frame period", the (n+1)-th frame period F(n+1) in the example illustrated in FIG. 19 corresponds to the first frame period. When the frame period F subsequent to the first frame period is referred to as the second frame period, the (n+2)-th frame period F(n+2) in the example illustrated in FIG. 19 corresponds to the second frame period. Among the predetermined number (m) of the subframe periods SF in the first frame period, when the "subframe period at a certain position in the sequence" is the subframe period SF in which the "other color component" is output, the "subframe period at a certain position in the sequence" in the (n+1)-th frame period F(n+1) in the example illustrated in FIG. 19 is the second subframe period SF2, and the "other color component" in the example illustrated in FIG. 19 is the "color obtained by adding red to yellow (Y+R)". According to the above, in the example illustrated in FIG. 19, the "subframe period at a certain position in the sequence" in the second frame period, that is, the subframe period SF2 in the (n+2)-th frame period F(n+2) is the subframe period SF in which the "color component different from the other color component" is output. In this example, the "color component different from the other color component" in the example illustrated in FIG. 19 is red (R), that is, the "color component corresponding to a part of the colors contained in the other color component".

When the frame period F including the subframe period SF in which another color component is output is referred to as the "first frame period", the (n+3)-th frame period F(n+3) in the example illustrated in FIG. 19 corresponds to the first frame period. When the frame period F subsequent to the first frame period is referred to as the second frame period, the (n+4)-th frame period F(n+4) in the example illustrated in FIG. 19 corresponds to the second frame period. Among the predetermined number (m) of the subframe periods SF in the first frame period, when the "subframe period at a certain position in the sequence" is the subframe period SF in which the "other color component" is output, the "subframe period at a certain position in the sequence" in the (n+3)-th frame period F(n+3) in the example illustrated in FIG. 19 is the first subframe period SF1, and the "other color component" in the example illustrated in FIG. 19 is the "color obtained by adding magenta to red (R+M)". According to the above, in the example illustrated in FIG. 19, the "subframe period at a certain position in the sequence" in the second frame period, that is, the subframe period SF1 in the (n+4)-th frame period F(n+4) is the subframe period SF in which the "color component different from the other color component" is output. In the case of the example illustrated in FIG. 19, the "color component different from the other color component" is magenta (M), that is, the "color component corresponding to a part of the colors contained in the other color component".

FIG. 20 is a diagram illustrating another example of subframe-period lighting colors in each frame period F, in a case of gradually changing the color of the subframe period SF in the second embodiment. For example, when the subframe display order determiner 72 employs the pattern 13 for the n-th frame period Fn and employs the pattern 12 for the (n+1)-th frame period F(n+1), the subframe lighting color transition controller 73 generates the frame periods F assigned intermediate patterns for gradually changing the color of the subframe period SF, the color of which is changed before and after the change in pattern, before the frame period F in which the colors of the subframe periods SF corresponding to the pattern 12 are output, that is, between the frame period F corresponding to the pattern 13 and the frame period F corresponding to the pattern 12.

More specifically, as illustrated in FIG. 20, for the n-th frame period Fn, the subframe lighting color transition controller 73 follows the pattern 13, and sets the color of the subframe period SF1 to red (R), sets the color of the subframe period SF2 to yellow (Y), sets the color of the subframe period SF3 to white (W), sets the color of the subframe period SF4 to green (G), and sets the color of the subframe period SF5 to blue (B).

Next, for the (n+1)-th frame period F(n+1), the subframe lighting color transition controller 73 employs an intermediate pattern 17 in which the color of the subframe period SF1 is set to red (R), the color of the subframe period SF2 is set to "color obtained by adding red to yellow (Y+R)", the color of the subframe period SF3 is set to "color obtained by adding yellow to white (W+Y)", the color of the subframe period SF4 is set to green (G), and the color of the subframe period SF5 is set to blue (B).

Next, for the (n+2)-th frame period F(n+2), the subframe lighting color transition controller 73 employs an intermediate pattern 18 in which the color of the subframe period SF1 is set to red (R), the color of the subframe period SF2 is set to red (R), the color of the subframe period SF3 is set to "color obtained by adding yellow to white (W+Y)", the color of the subframe period SF4 is set to green (G), and the color of the subframe period SF5 is set to blue (B).

Next, for the (n+3)-th frame period F(n+3), the subframe lighting color transition controller 73 employs an intermediate pattern 19 in which the color of the subframe period SF1 is set to "color obtained by adding magenta to red (R+M)", the color of the subframe period SF2 is set to red (R), the color of the subframe period SF3 is set to "color obtained by adding yellow to white (W+Y)", the color of the subframe period SF4 is set to green (G), and the color of the subframe period SF5 is set to blue (B).

Then, for the (n+4)-th frame period F(n+4), the subframe lighting color transition controller 73 sets the color of the subframe period SF1 to magenta (M), sets the color of the subframe period SF2 to red (R), sets the color of the subframe period SF3 to yellow (Y), sets the color of the subframe period SF4 to green (G), and sets the color of the subframe period SF5 to blue (B), thereby causing the subframe-period lighting colors corresponding to the pattern 12 to be in an employed state. As described with reference to FIG. 20, when there are three intermediate patterns before and after the change, and when a combination of yellow (Y) and white (W) is included in the combinations of colors before and after the change in the subframe periods SF, three intermediate patterns in each of which the "color obtained by adding yellow to white (W+Y)" serves as the subframe-period lighting color in the subframe period SF are provided consecutively. In the pattern 12 illustrated in FIG. 20, the order of colors of the subframe periods SF is magenta (M), red (R), yellow (Y), green (G), and blue (B), and is in the counterclockwise direction OD2 in the hue circle 200.

FIG. 21 is a diagram illustrating another example of subframe-period lighting colors in each frame period F, in a case of gradually changing the color of the subframe period SF in the second embodiment. For example, when the subframe display order determiner 72 employs the pattern 13 for the n-th frame period Fn and employs the pattern 15 for the (n+1)-th frame period F(n+1), the subframe lighting color transition controller 73 generates the frame periods F assigned intermediate patterns for gradually changing the color of the subframe period SF, the color of which is changed before and after the change in pattern, before the frame period F in which the colors of the subframe periods SF corresponding to the pattern 15 are output, that is, between the frame period F corresponding to the pattern 13 and the frame period F corresponding to the pattern 15.

More specifically, as illustrated in FIG. 21, for the n-th frame period Fn, the subframe lighting color transition controller 73 follows the pattern 13, and sets the color of the subframe period SF1 to red (R), sets the color of the subframe period SF2 to yellow (Y), sets the color of the subframe period SF3 to white (W), sets the color of the subframe period SF4 to green (G), and sets the color of the subframe period SF5 to blue (B).

Next, for the (n+1)-th frame period F(n+1), the subframe lighting color transition controller 73 employs an intermediate pattern 20 in which the color of the subframe period SF1 is set to red (R), the color of the subframe period SF2 is set to "color obtained by adding red to yellow (Y+R)", the color of the subframe period SF3 is set to "color obtained by adding green to white (W+G)", the color of the subframe period SF4 is set to green (G), and the color of the subframe period SF5 is set to blue (B).

Next, for the (n+2)-th frame period F(n+2), the subframe lighting color transition controller 73 employs an intermediate pattern 21 in which the color of the subframe period SF1 is set to red (R), the color of the subframe period SF2 is set to red (R), the color of the subframe period SF3 is set to green (G), the color of the subframe period SF4 is set to green (G), and the color of the subframe period SF5 is set to blue (B).

Next, for the (n+3)-th frame period F(n+3), the subframe lighting color transition controller 73 employs an intermediate pattern 22 in which the color of the subframe period SF1 is set to "color obtained by adding magenta to red (R+M)", the color of the subframe period SF2 is set to red (R), the color of the subframe period SF3 is set to green (G), the color of the subframe period SF4 is set to "color obtained by adding cyan to green (G+C)", and the color of the subframe period SF5 is set to blue (B).

Then, for the (n+4)-th frame period F(n+4), the subframe lighting color transition controller 73 sets the color of the subframe period SF1 to magenta (M), sets the color of the subframe period SF2 to red (R), sets the color of the subframe period SF3 to green (G), sets the color of the subframe period SF4 to cyan (C), and sets the color of the subframe period SF5 to blue (B), thereby causing the subframe-period lighting colors corresponding to the pattern 15 to be in an employed state.

Except as specifically described above, the second embodiment is the same as the first embodiment. In the second embodiment also, the specific concept of the operations of the liquid crystal control signal generator 75 and the light source control signal generator 76 is the same as that in the first embodiment.

In the frame period F in the second embodiment, the number of subframe periods SF in which the color other than the primary colors is output is two or more. The frame period F includes the subframe period SF in which the color component having the largest proportion among the color components of yellow (Y), cyan (C), magenta (M), and white (W) included in the frame image to be displayed in the frame period F is output, and the subframe period SF in which the color component having the second largest proportion is output. Consequently, more than one subframe period SF in which a mixed color is output can be included in the frame period F, thereby further reducing the occurrence of color breakup. Consequently, it is possible to further reduce the occurrence of a flicker on the image that would be caused by the color breakup.

Third Embodiment

FIG. 22 is a diagram illustrating combinations of colors of the subframe periods SF that may be generated when m=6. In a third embodiment, the combination of colors determined by the subframe display order determiner 72 is a pattern 21, a pattern 22, a pattern 23, or a pattern 24 illustrated in FIG. 22. The pattern 21 is a pattern in which the first color is red (R), the second color is yellow (Y), the third color is green (G), the fourth color is cyan (C), the fifth color is blue (B), and the sixth color is magenta (M). The pattern 22 is a pattern in which the first color is red (R), the second color is yellow (Y), the third color is white (W), the fourth color is green (G), the fifth color is cyan (C), and the sixth color is blue (B). The pattern 23 is a pattern in which the first color is red (R), the second color is yellow (Y), the third color is white (W), the fourth color is green (G), the fifth color is blue (B), and the sixth color is magenta (M). The pattern 24 is a pattern in which the first color is red (R), the second color is white (W), the third color is green (G), the fourth color is cyan (C), the fifth color is blue (B), and the sixth color is magenta (M).

In a similar manner to the first embodiment, the subframe lighting color transition controller 73 in the third embodiment controls the color transition orders of the subframe periods SF in each frame period F, based on the combinations of colors of the subframe periods SF determined by the subframe display order determiner 72. Hereinafter, an example of the control of the subframe-period lighting color performed in the third embodiment when the constraint described above is imposed, will be described with reference to FIG. 23 and FIG. 24. The concept of the control performed for the combination of the patterns described with reference to FIG. 23 and FIG. 24 is applicable to any combination other than the combination.

FIG. 23 is a diagram illustrating an example of subframe-period lighting colors in each frame period F, in a case of gradually changing the color of the subframe period SF in the third embodiment. When the subframe display order determiner 72 employs the pattern 21 for the n-th frame period Fn and employs the pattern 23 for the (n+1)-th frame period F(n+1), the subframe lighting color transition controller 73 generates the frame periods F assigned intermediate patterns for gradually changing the color of the subframe period SF, the color of which is changed before and after the change in pattern, before the frame period F in which the colors of the subframe periods SF corresponding to the pattern 23 are output, that is, between the frame period F corresponding to the pattern 21 and the frame period F corresponding to the pattern 23.

More specifically, as illustrated in FIG. 23, for the n-th frame period Fn, the subframe lighting color transition controller 73 follows the pattern 21, and sets the color of the subframe period SF1 to red (R), sets the color of the subframe period SF2 to yellow (Y), sets the color of the subframe period SF3 to green (G), sets the color of the subframe period SF4 to cyan (C), sets the color of the subframe period SF5 to blue (B), and sets the color of the subframe period SF6 to magenta (M).

Next, for the (n+1)-th frame period F(n+1), the subframe lighting color transition controller 73 employs an intermediate pattern 31 in which the color of the subframe period SF1 is set to red (R), the color of the subframe period SF2 is set to yellow (Y), the color of the subframe period SF3 is set to green (G), the color of the subframe period SF4 is set to "color obtained by adding green to cyan (C+G)", the color of the subframe period SF5 is set to blue (B), and the color of the subframe period SF6 is set to magenta (M).

Next, for the (n+2)-th frame period F(n+2), the subframe lighting color transition controller 73 employs an intermediate pattern 32 in which the color of the subframe period SF1 is set to red (R), the color of the subframe period SF2 is set to yellow (Y), the color of the subframe period SF3 is set to green (G), the color of the subframe period SF4 is set to green (G), the color of the subframe period SF5 is set to blue (B), and the color of the subframe period SF6 is set to magenta (M).

Next, for the (n+3)-th frame period F(n+3), the subframe lighting color transition controller 73 employs an intermediate pattern 33 in which the color of the subframe period SF1 is set to red (R), the color of the subframe period SF2 is set to yellow (Y), the color of the subframe period SF3 is set to "color obtained by adding white to green (G+W)", the color of the subframe period SF4 is set to green (G), the color of the subframe period SF5 is set to blue (B), and the color of the subframe period SF6 is set to magenta (M).

Then, for the (n+4)-th frame period F(n+4), the subframe lighting color transition controller 73 sets the color of the subframe period SF1 to red (R), sets the color of the subframe period SF2 to yellow (Y), sets the color of the subframe period SF3 to white (W), sets the color of the subframe period SF4 to green (G), sets the color of the subframe period SF5 to blue (B), and sets the color of the subframe period SF6 to magenta (M), thereby causing the pattern 23 to be in an employed state.

FIG. 24 is a diagram illustrating another example of subframe-period lighting colors in each frame period F, in a case of gradually changing the color of the subframe period SF in the third embodiment. When the subframe display order determiner 72 employs the pattern 22 for the n-th frame period Fn and employs the pattern 23 for the (n+1)-th frame period F(n+1), the subframe lighting color transition controller 73 generates the frame periods F assigned intermediate patterns for gradually changing the color of the subframe period SF, the color of which is changed before and after the change in pattern, before the frame period F in which the colors of the subframe periods SF corresponding to the pattern 23 are output, that is, between the frame period F corresponding to the pattern 22 and the frame period F corresponding to the pattern 23.

More specifically, as illustrated in FIG. 24, for the n-th frame period Fn, the subframe lighting color transition controller 73 follows the pattern 22, and sets the color of the subframe period SF1 to red (R), sets the color of the subframe period SF2 to yellow (Y), sets the color of the subframe period SF3 to white (W), sets the color of the subframe period SF4 to green (G), sets the color of the subframe period SF5 to cyan (C), and sets the color of the subframe period SF6 to blue (B).

Next, for the (n+1)-th frame period F(n+1), the subframe lighting color transition controller 73 employs an intermediate pattern 34 in which the color of the subframe period SF1 is set to red (R), the color of the subframe period SF2 is set to yellow (Y), the color of the subframe period SF3 is set to white (W), the color of the subframe period SF4 is set to green (G), the color of the subframe period SF5 is set to "color obtained by adding blue to cyan (C+B)", and the color of the subframe period SF6 is set to blue (B).

Next, for the (n+2)-th frame period F(n+2), the subframe lighting color transition controller 73 employs an intermediate pattern 35 in which the color of the subframe period SF1 is set to red (R), the color of the subframe period SF2 is set to yellow (Y), the color of the subframe period SF3 is set to white (W), the color of the subframe period SF4 is set to green (G), the color of the subframe period SF5 is set to blue (B), and the color of the subframe period SF6 is set to blue (B).

Next, for the (n+3)-th frame period F(n+3), the subframe lighting color transition controller 73 employs an intermediate pattern 36 in which the color of the subframe period SF1 is set to red (R), the color of the subframe period SF2 is set to yellow (Y), the color of the subframe period SF3 is set to white (W), the color of the subframe period SF4 is set to green (G), the color of the subframe period SF5 is set to blue (B), and the color of the subframe period SF6 is set to "color obtained by adding magenta to blue (B+M)".

Then, for the (n+4)-th frame period F(n+4), the subframe lighting color transition controller 73 sets the color of the subframe period SF1 to red (R), sets the color of the subframe period SF2 to yellow (Y), sets the color of the subframe period SF3 to white (W), sets the color of the subframe period SF4 to green (G), sets the color of the subframe period SF5 to blue (B), and sets the color of the subframe period SF6 to magenta (M), thereby causing the pattern 23 to be in an employed state.

Except as specifically described above, the third embodiment is the same as the first embodiment. In the third embodiment also, the specific concept of the operations of the liquid crystal control signal generator 75 and the light source control signal generator 76 is the same as that in the first embodiment.

With the third embodiment, it is possible to reduce the occurrence of a flicker on the image even when m=6.

The modification describe above is also applicable to the second embodiment and the third embodiment. That is, in the second embodiment and the third embodiment also, the subframe display order determiner 72 may not limit the colors output in the three subframe periods SF of the m subframe periods SF included in one frame period F, to the first primary color, the second primary color, and the third primary color.

In the embodiments described above, the number of intermediate patterns is three (three frame periods), when the color of the subframe period assigned a color not corresponding to any of the first primary color, the second primary color, and the third primary color is changed from the mixed color other than white (W) to another mixed color other than white (W). However, the embodiment is not limited thereto. The frame periods generated as the intermediate patterns may be longer than three frames, or may be shorter than three frames.

FIG. 25 is a diagram illustrating another example of subframe-period lighting colors in each frame period F, in a case of gradually changing the color of the subframe period SF, the color of which is changed before and after the change in pattern. In this example, for the n-th frame period Fn, the subframe lighting color transition controller 73 follows the pattern 1, and sets the color of the subframe period SF1 to red (R), sets the color of the subframe period SF2 to yellow (Y), sets the color of the subframe period SF3 to green (G), and sets the color of the subframe period SF4 to blue (B).

Next, for the (n+1)-th frame period F(n+1), the subframe lighting color transition controller 73 employs an intermediate pattern 41 in which the color of the subframe period SF1 is set to red (R), the color of the subframe period SF2 is set to "one of variations of mixed color of yellow and green (YG1)", the color of the subframe period SF3 is set to green (G), and the color of the subframe period SF4 is set to blue (B).

Next, for the (n+2)-th frame period F(n+2), the subframe lighting color transition controller 73 employs an intermediate pattern 42 in which the color of the subframe period SF1 is set to red (R), the color of the subframe period SF2 is set to "another variation of mixed color of yellow and green (YG2)", the color of the subframe period SF3 is set to green (G), and the color of the subframe period SF4 is set to blue (B).

In this example, the ratio of the color component Φ and the color component Ψ in "one of variations of mixed color of Φ and Ψ (ΦΨ1)" is different from that in "another variation of mixed color of Φ and Ψ (ΦΨ2)". In the "one of variations of mixed colors of Φ and Ψ (ΦΨ1)", the ratio of the color components satisfies the condition where $\Phi>\Psi$. In the "other variation of mixed colors of Φ and Ψ (ΦΨ2)", the ratio of the color components satisfies the condition where $\Phi<\Psi$.

Next, for the (n+3)-th frame period F(n+3), the subframe lighting color transition controller 73 employs an intermediate pattern 43 in which the color of the subframe period SF1 is set to red (R), the color of the subframe period SF2 is set to green (G), the color of the subframe period SF3 is set to green (G), and the color of the subframe period SF4 is set to blue (B).

Next, for the (n+4)-th frame period F(n+4), the subframe lighting color transition controller 73 employs an intermediate pattern 44 in which the color of the subframe period SF1 is set to red (R), the color of the subframe period SF2 is set to green (G), the color of the subframe period SF3 is set to "one of variations of mixed color of green and cyan (GC1)", and the color of the subframe period SF4 is set to blue (B).

Next, for the (n+5)-th frame period F(n+5), the subframe lighting color transition controller 73 employs an intermediate pattern 45 in which the color of the subframe period SF1 is set to red (R), the color of the subframe period SF2 is set to green (G), the color of the subframe period SF3 is set to "another variation of mixed color of green and cyan (GC2)", and the color of the subframe period SF4 is set to blue (B).

Then, for the (n+6)-th frame period F(n+6), the subframe lighting color transition controller 73 sets the color of the subframe period SF1 to red (R), sets the color of the subframe period SF2 to green (G), sets the color of the subframe period SF3 to cyan (C), and sets the color of the subframe period SF4 to blue (B), thereby causing the pattern 2 to be in an employed state.

FIG. 26 is a diagram illustrating another example of subframe-period lighting colors in each frame period F, in a case of gradually changing the color of the subframe period SF, the color of which is changed before and after the change in pattern. In this example, for the n-th frame period Fn, the subframe lighting color transition controller 73 follows the pattern 1, and sets the color of the subframe period SF1 to red (R), sets the color of the subframe period SF2 to yellow (Y), sets the color of the subframe period SF3 to green (G), and sets the color of the subframe period SF4 to blue (B).

Next, for the (n+1)-th frame period F(n+1), the subframe lighting color transition controller 73 employs an intermediate pattern 46 in which the color of the subframe period SF1 is set to red (R), the color of the subframe period SF2 is set to green (G), the color of the subframe period SF3 is set to green (G), and the color of the subframe period SF4 is set to blue (B).

Then, for the (n+2)-th frame period F(n+1), the subframe lighting color transition controller 73 sets the color of the subframe period SF1 to red (R), sets the color of the subframe period SF2 to green (G), sets the color of the subframe period SF3 to cyan (C), and sets the color of the subframe period SF4 to blue (B), thereby causing the pattern 2 to be in an employed state.

As described with reference to FIG. 25 and FIG. 26, the number of the intermediate patterns is not limited to three (three frame periods) in changing the color from the mixed color other than white (W) to another mixed color other than white (W). FIG. 25 and FIG. 26 each exemplify an example in which m=4, which corresponds to the first embodiment. However, the number of the intermediate patterns can also be changed even in a case where m=5 or m=6, in the same manner as in a case where m=4.

The light source in the light source device L is not limited to the first light source 11R, the second light source 11G, and the third light source 11B. The light source device L may also include a light source of a mixed color or another color. In this case, the frame period F includes at least one subframe period SF in which light in mixed color obtained by combining at least two colors from among the light sources included in the light source device L is emitted.

The display panel P is not limited to the liquid crystal display panel using a polymer-dispersed liquid crystal. The display panel may be any display panel that uses a drive control method to which the FSC method is applicable. For example, the liquid crystal display panel may be a transmissive, transflective, or reflective panel.

Other functions and effects brought about by the aspects described in the embodiments and modification described above, which are apparent from the description of the present specification or can be appropriately conceived by those skilled in the art, are naturally understood to be brought about by the present disclosure.

What is claimed is:

1. A display device comprising:

a display panel configured to display an image using light from outside the display panel; and a light source configured to emit light to the display panel, wherein, the light source includes a first light source configured to emit light in a first primary color, a second light source configured to emit light in a second primary color, and a third light source configured to emit light in a third primary color, a frame period that is a display period of one frame image includes a predetermined number of subframe periods, the predetermined number is four or greater, and color reproduction of the one frame image is performed by a combination of colors that are output in the predetermined number of subframe periods, an output order of colors of the subframe periods is an order of colors in a clockwise direction or in a counterclockwise direction in a hue circle, and when a mixed color component of each of a plurality of the frame images to be successively displayed on the display panel is transitioned from a first mixed color component to a second mixed color component, and when the frame period prior to the transition includes a subframe period in which the first mixed color component is output, the frame period including a subframe period in which another color component between the first mixed color component and the second mixed color component in the hue circle is output, is generated before the frame period subsequent to the transition and including a subframe period in which the second mixed color component is output.

2. The display device according to claim 1, wherein the other color component is a color component between the first mixed color and the second mixed color in the order of colors in the clockwise direction or in the counterclockwise direction in the hue circle.

3. The display device according to claim 1, wherein the first primary color is red, the second primary color is green, and the third primary color is blue.

4. A display device comprising:

a display panel configured to display an image using light from outside the display panel; and a light source configured to emit light to the display panel, wherein, the light source includes a first light source configured to emit light in a first primary color, a second light source configured to emit light in a second primary color, and a third light source configured to emit light in a third primary color, a frame period that is a display period of one frame image includes a predetermined number of subframe periods, the predetermined number is four or greater, and color reproduction of the one frame image is performed by a combination of colors that are output in the predetermined number of subframe periods, an output order of colors of the subframe periods is an order of colors in a clockwise direction or in a counterclockwise direction in a hue circle, the frame period includes at least a subframe period in which the first primary color is output, a subframe period in which the second primary color is output, and a subframe period in which the third primary color is output, a color output in another subframe period included in the frame period is yellow, cyan, magenta, or white, and the color output in the other subframe period corresponds to a color component having a larger proportion in color components, the color components including mixed color components and a white color component included in a frame image to be displayed in a frame period including the other subframe period.

5. The display device according to claim 4, wherein when number of the other subframe periods is two or more, the frame period includes a first subframe period and a second subframe period, the first subframe period is a subframe period in which a color component having a largest proportion among color components of yellow, cyan, magenta, and white included in the frame image to be displayed in the frame period is output, and the second subframe period is a subframe period in which a color component having a second largest proportion thereamong is output.

6. A display device comprising:

a display panel configured to display an image using light from outside the display panel; and a light source configured to emit light to the display panel, wherein, the light source includes a first light source configured to emit light in a first primary color, a second light source configured to emit light in a second primary color, and a third light source configured to emit light in a third primary color, a frame period that is a display period of one frame image includes a predetermined number of subframe periods, the predetermined number is four or greater, and color reproduction of the one frame image is performed by a combination of colors that are output in the predetermined number of subframe periods, an output order of colors of the subframe periods is an order of colors in a clockwise direction or in a counterclockwise direction in a hue circle, the frame period includes at least a subframe period in which the first primary color is output, a subframe period in which the second primary color is output, and a subframe period in which the third primary color is output, a color output in another subframe period included in the frame period is yellow, cyan, magenta, or white, and the color to be output in the other subframe period corresponds to a color component determined from among mixed color components and a white color component included in a frame image to be displayed in a frame period including the other subframe period, based on a result of a comparison of the mixed color components and the white color component with and a predetermined threshold, the threshold is individually set for each color, a threshold of yellow is smaller than a threshold of cyan and a threshold of magenta, and a threshold of white is smaller than a threshold of cyan and a threshold of magenta.

7. A display device comprising:

a display panel configured to display an image using light from outside the display panel; and a light source configured to emit light to the display panel, wherein, the light source includes a first light source configured to emit light in a first primary color, a second light source configured to emit light in a second primary color, and a third light source configured to emit light in a third primary color, a frame period that is a display period of one frame image includes a predetermined number of subframe periods, the predetermined number is four or greater, and color reproduction of the one frame image is performed by a combination of colors that are output in the predetermined number of subframe periods, an output order of colors of the subframe periods is an order of colors in a clockwise direction or in a counterclockwise direction in a hue circle, and when a mixed color component, which is contained most in a color of each of frame images to be successively displayed on the display panel, is transitioned from a mixed color component other than white to white, and when the frame period prior to the transition includes a subframe period in which the mixed color component other than white is output, the frame period including a subframe period in which a color component obtained by making the mixed color component other than white closer to white is output is generated before the frame period that is subsequent to the transition and that includes a subframe period in which white is output.

8. The display device according to claim 1, wherein each subframe period includes a writing period in which pixel signals are written to a plurality of pixels provided in the display panel, and a lighting period that is a period after the writing period and in which the light source is turned ON.

9. The display device according to claim 1, wherein the display panel is a display panel in which polymer-dispersed liquid crystals are sealed between two substrates facing each other.

10. The display device according to claim 1, wherein when a color that is output in the other subframe period included in the frame period is yellow, the color that is output in the other subframe period in the predetermined number of frame periods is transitioned from yellow to red, green, or white.

11. The display device according to claim 1, wherein when, among the predetermined number of subframe periods in a first frame period, a subframe period at a certain position in a sequence is a subframe period in which the other color component is output, and when the subframe period at the certain position in a sequence in a second frame period after the first frame period is a subframe period in which a color component different from the other color component is output, the other color component is either a color component corresponding to a part of colors contained in the other color component or a white color component, and the first frame period is the frame period including a subframe period in which the other color component is output.

12. The display device according to claim 1, wherein the frame period includes at least a subframe period in which the first primary color is output, a subframe period in which the second primary color is output, and a subframe period in which the third primary color is output.

13. The display device according to claim 12, wherein a color output in another subframe period included in the frame period is yellow, cyan, magenta, or white.

* * * * *